United States Patent
Korekawa et al.

(10) Patent No.: US 11,858,082 B2
(45) Date of Patent: Jan. 2, 2024

(54) CUTTING MACHINE

(71) Applicant: MAKITA CORPORATION, Anjo (JP)

(72) Inventors: Hiroto Korekawa, Anjo (JP); Akihiro Hozumi, Anjo (JP); Toshiyuki Kani, Anjo (JP)

(73) Assignee: MAKITA CORPORATION, Anjo (JP)

( * ) Notice: Subject to any disclaimer, the term of this patent is extended or adjusted under 35 U.S.C. 154(b) by 133 days.

(21) Appl. No.: 17/666,210

(22) Filed: Feb. 7, 2022

(65) Prior Publication Data

US 2022/0281048 A1 Sep. 8, 2022

(30) Foreign Application Priority Data

Mar. 2, 2021 (JP) ................. 2021-032400

(51) Int. Cl.
*B23Q 17/24* (2006.01)
*B23D 45/04* (2006.01)

(52) U.S. Cl.
CPC ....... *B23Q 17/2404* (2013.01); *B23D 45/048* (2013.01)

(58) Field of Classification Search
CPC ... Y10T 83/828; Y10T 83/839; Y10T 83/853; B23D 59/003; B23D 45/048; B23D 33/12; B23Q 17/24; B23Q 17/2404; B27B 31/06
USPC ..................... 83/520, 521, 522.15
See application file for complete search history.

(56) References Cited

U.S. PATENT DOCUMENTS

| | | | | |
|---|---|---|---|---|
| 4,676,130 A | * | 6/1987 | Nutt | B27B 31/06 83/155 |
| 5,363,469 A | * | 11/1994 | Elderfield | G02B 6/4206 359/710 |
| 6,481,322 B1 | * | 11/2002 | Hsiung | B23D 59/003 362/89 |
| 6,578,459 B2 | | 6/2003 | Waite | |
| 6,616,295 B2 | | 9/2003 | Sako et al. | |
| 6,742,430 B2 | | 6/2004 | Chen | |
| 6,820,528 B1 | | 11/2004 | Liu et al. | |
| 7,377,202 B1 | | 5/2008 | Shibata | |

(Continued)

FOREIGN PATENT DOCUMENTS

| | | | | |
|---|---|---|---|---|
| CN | 108349027 | * | 7/2018 | ........... B23D 59/003 |
| DE | 4106710 | * | 9/1992 | ........... B23D 59/003 |

(Continued)

*Primary Examiner* — Evan H MacFarlane
(74) *Attorney, Agent, or Firm* — Oliff PLC

(57) ABSTRACT

An illuminator that emits light from a radially outer portion of the cutting tool toward the cutting tool includes a first light source and a second light source, and a first lens and a second lens. The first lens has a first emission surface including a first outermost portion located farthest and at a first distance from a first center axis including a first light source center of the first light source and perpendicular to the first light source. The second lens has a second emission surface including a second outermost portion located farthest and at a second distance from a second center axis including a second light source center of the second light source and perpendicular to the second light source. A distance between the first center axis and the second center axis is shorter than a sum of the first distance and the second distance.

20 Claims, 22 Drawing Sheets

(56) References Cited

U.S. PATENT DOCUMENTS

| | | | | |
|---|---|---|---|---|
| 7,398,719 B2* | 7/2008 | Peot | ............... | B23Q 17/2404 83/520 |
| 2001/0049988 A1* | 12/2001 | Ushiwata | ............. | B23D 59/003 83/520 |
| 2002/0131267 A1* | 9/2002 | Van Osenbruggen | | B23Q 17/2404 362/109 |
| 2002/0152862 A1* | 10/2002 | Waite | ............... | B23D 59/003 83/522.11 |
| 2003/0140758 A1* | 7/2003 | Weusthof | ............ | B27B 5/32 83/520 |
| 2003/0202241 A1* | 10/2003 | Blumel | .............. | F21V 5/007 359/365 |
| 2004/0136795 A1* | 7/2004 | Chen | ............... | B23Q 3/183 408/16 |
| 2005/0094386 A1* | 5/2005 | Zhang | .............. | B23Q 17/2404 362/259 |
| 2005/0166737 A1* | 8/2005 | Caluori | ............. | B23D 59/003 83/520 |
| 2005/0278959 A1* | 12/2005 | Nishimiya | ............. | B23D 59/00 30/388 |
| 2006/0230894 A1 | 10/2006 | Meredith et al. | | |
| 2007/0151432 A1* | 7/2007 | Garcia | .............. | B23D 59/003 83/477.2 |
| 2010/0242695 A1* | 9/2010 | Xu | ............... | B23Q 17/24 83/13 |
| 2012/0255415 A1* | 10/2012 | Koegel | ............. | B27G 19/08 356/400 |
| 2013/0247737 A1* | 9/2013 | Chen | ............... | B23D 59/003 83/521 |
| 2015/0183074 A1 | 7/2015 | Kani et al. | | |
| 2020/0001496 A1* | 1/2020 | Bindhammer | ....... | B23D 59/003 |

FOREIGN PATENT DOCUMENTS

| | | | |
|---|---|---|---|
| EP | 2014399 A1 | 1/2009 | |
| EP | 2014399 B1 | 1/2014 | |
| JP | H01-163020 U | 11/1989 | |
| JP | 2000-317901 A | 11/2000 | |
| JP | 2001347501 | * 12/2001 | ............... B25H 7/04 |
| JP | 2002-154074 A | 5/2002 | |
| JP | 2003-048118 A | 2/2003 | |
| JP | 2003-266401 A | 9/2003 | |
| JP | 2004-009182 A | 1/2004 | |
| JP | 2005-125550 A | 5/2005 | |
| JP | 2010-280013 A | 12/2010 | |
| JP | 2011-045995 A | 3/2011 | |
| JP | 2012-157931 A | 8/2012 | |
| JP | 2015-123543 A | 7/2015 | |
| WO | 2016/138281 A1 | 9/2016 | |

* cited by examiner

CUTTING MACHINE

CROSS-REFERENCE TO RELATED APPLICATIONS

This application claims the benefit of priority to Japanese Patent Application No. 2021-032400, filed on Mar. 2, 2021, the entire contents of which are hereby incorporated by reference.

BACKGROUND

1. Technical Field

The present disclosure relates to a cutting machine for cutting, for example, a wood workpiece.

2. Description of the Background

A cutting machine of this type includes a machine body including a cutting tool, and a base that vertically swingably supports the machine body. The cutting tool rotates when powered by an electric motor. The rotating cutting tool is used to cut a workpiece placed under the machine body. The cutting machine can thus cut a workpiece.

For example, a known cutting machine includes a laser to indicate the position of a workpiece that is to be cut with the cutting tool. The laser illuminates the workpiece placed below with a laser beam. The laser beam is aligned with an ink line drawn on the workpiece. The cutting tool is then moved downward to cut at the position of the ink line.

Another known cutting machine includes a light-emitting device (LED) for ink line positioning instead of a laser. A cutting machine described in U.S. Pat. No. 6,742,430 or European Patent Application Publication No. 2014399 includes a single LED in an illuminator located on the extension of a disc plane. The LED illuminates the cutting tool below. The shadow of the cutting tool is cast on the surface of the workpiece placed below the cutting tool. The shadow of the cutting tool is aligned with the position of the ink line drawn on the workpiece. The cutting tool is then moved downward to cut at the position of the ink line.

BRIEF SUMMARY

Known illumination with a single LED may not clearly cast a shadow of the cutting tool on the surface of a workpiece when, for example, a machine body is at the top dead center apart from the workpiece. The shadow of the cutting tool may not be aligned with the ink line drawn on the workpiece. An illuminator is to clearly cast a shadow of a cutting tool on the surface of a workpiece.

An aspect of the present disclosure provides a cutting machine, including:
- a machine body including a cutting tool, the cutting tool being disc-shaped; and
- an illuminator configured to emit light from a radially outer portion of the cutting tool toward the cutting tool, the illuminator including
  - a first light source and a second light source located across an imaginary plane including the cutting tool,
  - a first lens having a first incidence surface to receive light incident from the first light source and a first emission surface through which light is emittable, the first emission surface including a first outermost portion located farthest and at a first distance from a first center axis, the first center axis including a first light source center of the first light source and perpendicular to the first light source, and
  - a second lens having a second incidence surface to receive light incident from the second light source and a second emission surface through which light is emittable, the second emission surface including a second outermost portion located farthest and at a second distance from a second center axis, the second central axis including a second light source center of the second light source and perpendicular to the second light source, wherein a distance between the first center axis and the second center axis is shorter than a sum of the first distance and the second distance.

The cutting machine according to the above aspect of the present disclosure clearly casts a shadow of the cutting tool on the surface of a workpiece.

DETAILED DESCRIPTION

A first embodiment of the present disclosure will be described with reference to FIGS. 1 to 17. A cutting machine 1 according to the present embodiment is a sliding miter saw.

Figure 1:
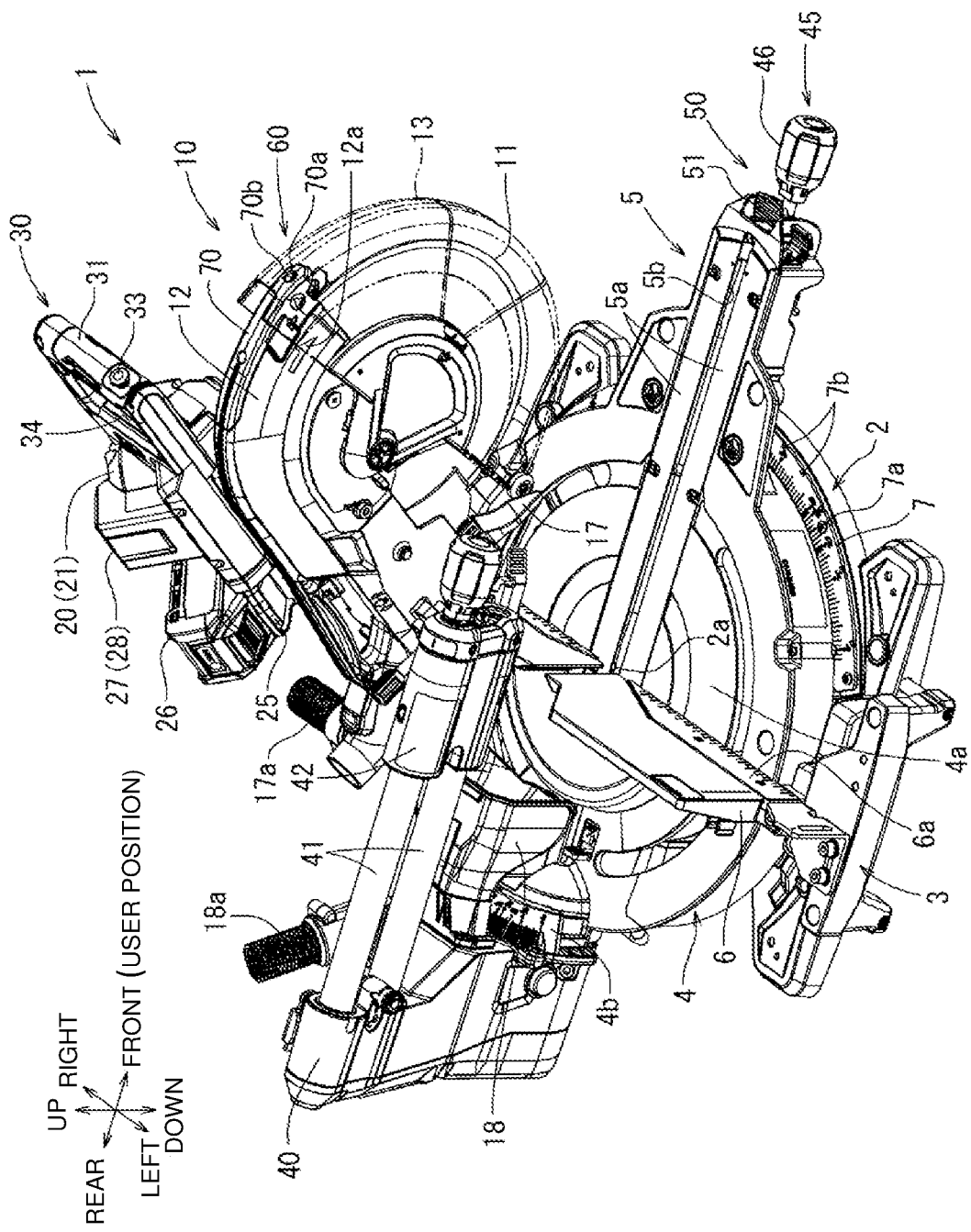
FIG. 1 is a perspective view of a cutting machine according to a first embodiment.

As shown in FIG. 1, the cutting machine 1 includes a base 2, a turntable 4, and a machine body 10. The base 2 is placed on, for example, a table or a floor. The turntable 4 receives a workpiece. The turntable 4 is located on and supported by the base 2. The machine body 10 is installed on the turntable 4. The machine body 10 rotatably supports a substantially disc-shaped cutting tool 11. The cutting tool 11 is called a tipped saw blade.

A user in front of the cutting machine 1 performs cutting. In the example below, the vertical and lateral directions of components and structures are defined as viewed from the user. The front and the rear of the components and the structures are defined as the front being closer to the user. The direction in which an LED 72 emits light, or more specifically, the direction in which a radiated ray L is applied is denoted with P, and the direction opposite to this direction is denoted with Q. The upstream position in the rotation direction of the cutting tool or the thickness direction of an LED substrate is denoted with T, and the downstream position in the rotation direction or the thickness direction is denoted with U. The P-Q direction and the T-U direction are orthogonal to each other.

As shown in FIG. 1, the turntable 4 is substantially circular in a plan view. The turntable 4 includes a table upper surface 4a located horizontally. The turntable 4 includes a rotation shaft 2a located at a substantially circular center. The turntable 4 is horizontally rotatable with respect to the base 2 around the rotation shaft 2a.

Sub-tables 3 are attached to the left and right sides of the base 2. The sub-tables 3 are located on the left and right sides of the turntable 4, and have upper surfaces level with the table upper surface 4a. The turntable 4 includes a table extension 5. The table extension 5 extends along the side surface of the cutting tool 11. The table upper surface 4a and the upper surface of the table extension 5 include a cutting edge plate 5a that extends horizontally. The cutting edge plate 5a has a cut groove 5b in the middle. The groove 5b extends along the side surface of the cutting tool 11.

Figure 4:
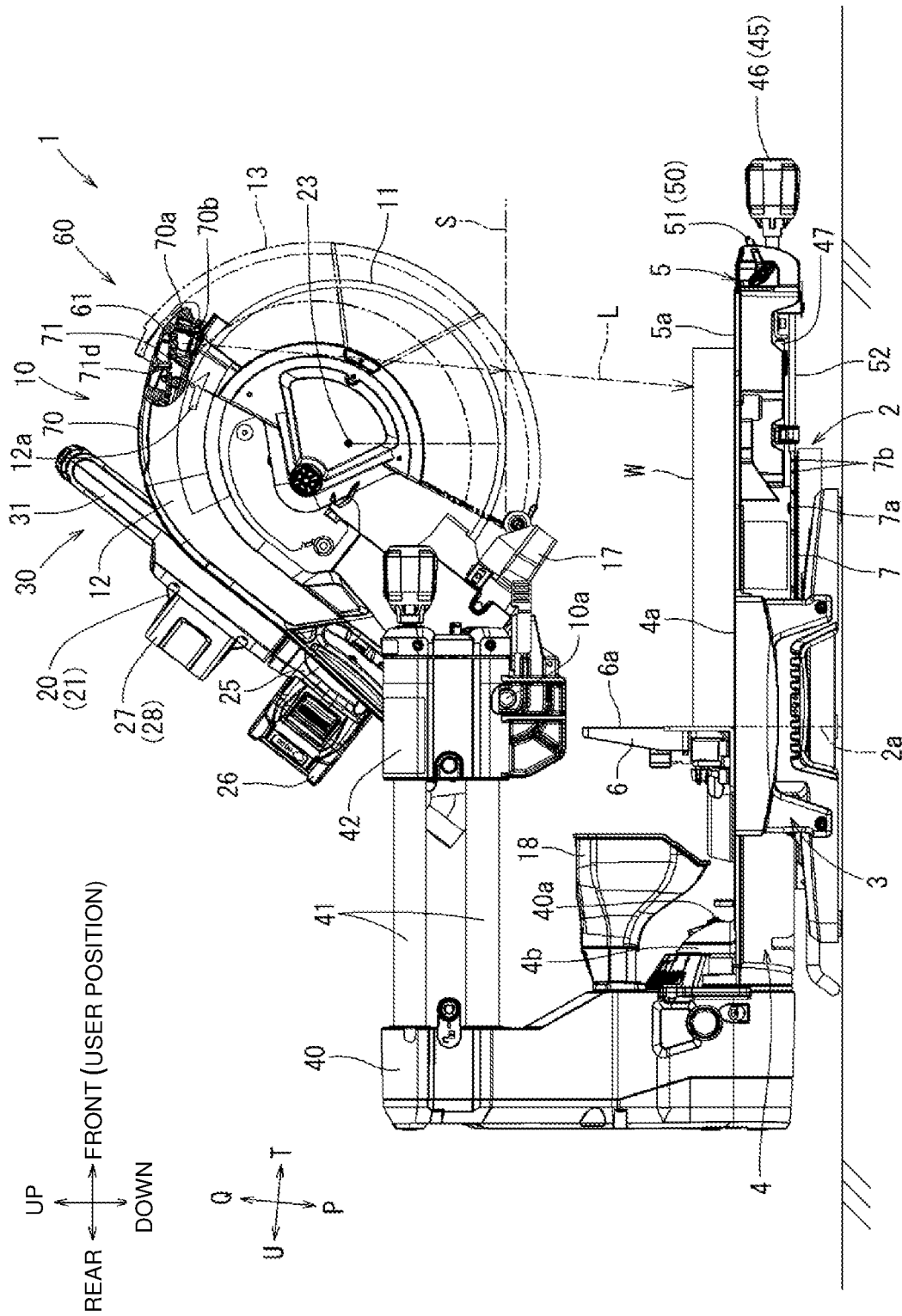
FIG. 4 is a left side view of the cutting machine when a machine body is at a top dead center, including a partial vertical section.

As shown in FIGS. 1 and 4, a positioning fence 6 is located on the turntable 4. The positioning fence 6 is a wall extending laterally and upward. The positioning fence 6 has a positioning surface 6a that stands erect as its front surface. The positioning surface 6a is located on the vertical plane including the rotation shaft 2a of the turntable 4. A workpiece W on the table upper surface 4a is placed into contact with the positioning surface 6a to be fixed in position in the front-rear direction.

As shown in FIGS. 1 and 4, an arc-shaped miter scale plate 7 is located in a substantially semicircular area on the front portion of the base 2. The miter scale plate 7 extends horizontally below the table upper surface 4a. The miter scale plate 7 has multiple positioning recesses 7b. Each positioning recess 7b is a groove extending radially. The positioning recesses 7b are arranged at predetermined angular intervals in the circumferential direction of the miter scale plate 7. The positioning recesses 7b can receive the tip of a positioning pin 52 as described later.

The miter scale plate 7 is fixed to the base 2 with fixing screws 7a. The fixing screws 7a are received in slits in the base 2. The angle between the positioning fence 6 and the cutting tool 11 can be finely adjusted by unscrewing the fixing screws 7a and moving the miter scale plate 7 laterally. For example, the angle between the positioning fence 6 and the cutting tool 11 can be adjusted to be precisely perpendicular to each other while the positioning pin 52 is received in the positioning recess 7b positioned at right angles to the positioning pin 52. This adjustment is mainly performed during production.

As shown in FIG. 4, a body support arm 40 is located behind the turntable 4. The body support arm 40 extends substantially upward. The body support arm 40 includes a lateral tilt support shaft 40a extending in the front-rear direction. The body support arm 40 is supported to be laterally tiltable with respect to an arm supporter 4b in the turntable 4 about the lateral tilt support shaft 40a.

Two long slide bars 41 are located at an upper portion of the body support arm 40. The slide bars 41 extend horizontally and parallel to the side surface of the cutting tool 11. The two slide bars 41 extend parallel to each other in the vertical direction. The slide bars 41 support a slide base 42. The slide base 42 is slidable in the front-rear direction. The slide base 42 slides in the front-rear direction to allow the cutting tool 11 to cut a workpiece W having a wide width in the front-rear direction placed on the turntable 4. The machine body 10 includes a vertical swing support shaft 10a extending laterally. The machine body 10 is vertically swingable with respect to the slide base 42 about the vertical swing support shaft 10a.

Figure 3:
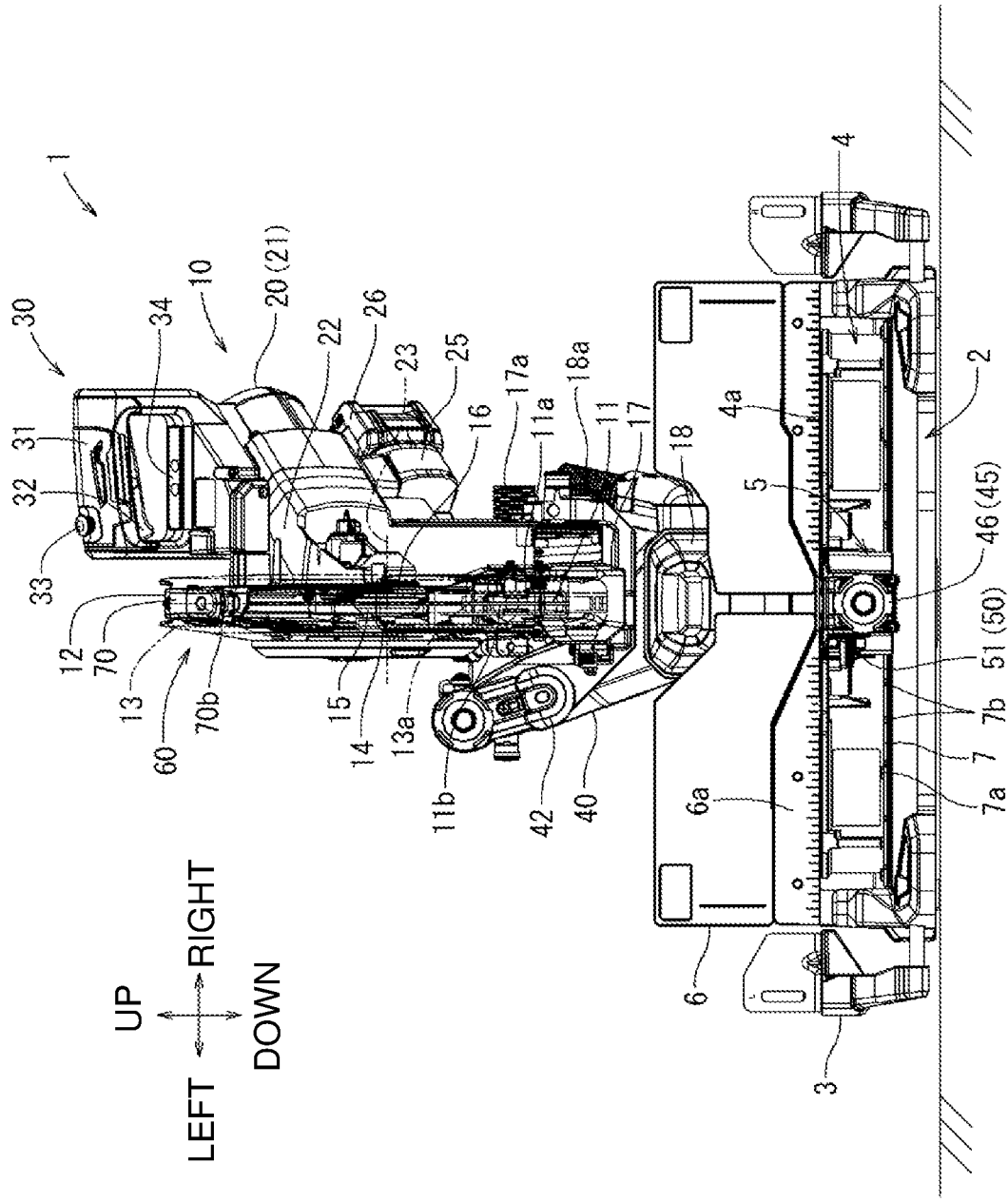
FIG. 3 is a front view of the cutting machine.

As shown in FIG. 3, the cutting tool 11 is integrally attached to an output shaft 23. The output shaft 23 extends laterally and is rotatably supported by the machine body 10. The cutting tool 11 is attached to the output shaft 23 with a fixing screw 14 with the rotation center held between an outer flange 15 and an inner flange 16.

As shown in FIG. 1, the machine body 10 includes a stationary cover 12 and a movable cover 13. The stationary cover 12 and the movable cover 13 cover the periphery of the cutting tool 11. The stationary cover 12 covers the upper half of the cutting tool 11. An outlined arrow 12a indicating the rotation direction of the cutting tool 11 is indicated on the left side of the stationary cover 12. The movable cover 13 can cover the lower half of the cutting tool 11. The movable cover 13 rotates in cooperation with a vertical swing of the machine body 10 to open or close the lower half of the cutting tool 11. When the machine body 10 is swung upward, the movable cover 13 rotates in a closing direction (clockwise in FIG. 1). Thus, the lower half of the cutting tool 11 is covered. When the machine body 10 is swung downward, the movable cover 13 rotates in an opening direction (counterclockwise in FIG. 1). Thus, the lower half of the cutting tool 11 is exposed.

As shown in FIG. 3, the movable cover 13 is integrally formed from a resin material with high light transmittance. The resin material is, for example, transparent polycarbonate. The movable cover 13 has a through-hole 13a. The through-hole 13a circumferentially extends in the circumferential side surface and through the movable cover 13.

Figure 2:
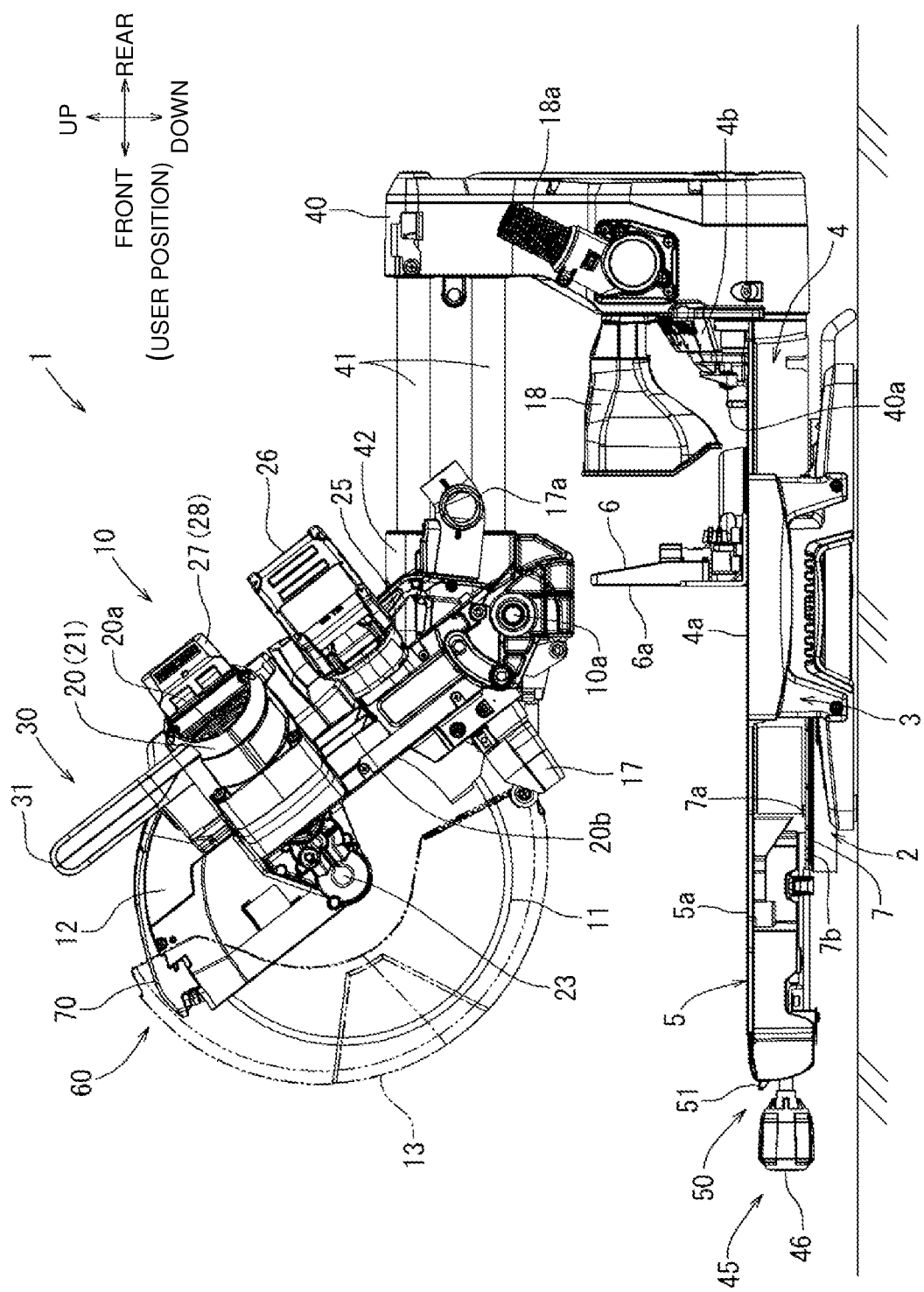
FIG. 2 is a right side view of the cutting machine.

As shown in FIGS. 2 and 4, a dust-collection guide 17 is located at the lower rear of the stationary cover 12. The dust-collection guide 17 has an opening at the front and has a substantially C-shaped cross section. The dust-collection guide 17 reduces chips resulting from cutting the workpiece W being scattered to the rear, left, or right of the cutting tool 11. The dust-collection guide 17 has an upper portion connected to a dust-collection hose 17a. The dust-collection hose 17a extends rightward from the rear portion of the machine body 10.

A rear dust-collection port 18 is located in front of the body support arm 40. The rear dust-collection port 18 is tubular and has an opening at the front. The rear dust-collection port 18 reduces chips being scattered to the rear of the dust-collection guide 17.

The dust-collection guide 17 is continuous with the dust-collection hose 17*a*. The rear dust-collection port 18 is continuous with a dust-collection hose 18*a*. The dust-collection hoses 17*a* and 18*a* are connected to a dust collector installed separately from the cutting machine 1. This structure can transport chips scattered around the dust-collection guide 17 and the rear dust-collection port 18 to the dust collector through the dust-collection hoses 17*a* and 18*a*.

As shown in FIGS. 2 and 3, the machine body 10 includes a motor housing 20 on the right of the stationary cover 12. The motor housing 20 has a substantially cylindrical shape extending upward and rightward toward the rear when the machine body 10 is at a top dead center. On the rear right end face, the motor housing 20 has an inlet 20*a* that can take in outside air. The machine body 10 accommodates an electric motor 21. The electric motor 21 is, for example, a direct-current (DC) brushless motor.

As shown in FIG. 3, a gear housing 22 is located between the motor housing 20 and the stationary cover 12 in the lateral direction. The motor housing 20 and the gear housing 22 are internally continuous with each other. Power from the electric motor 21 is transmitted to the output shaft 23 while being reduced via a reduction gear train accommodated in the gear housing 22. Thus, in response to driving of the electric motor 21, the cutting tool 11 attached to the output shaft 23 rotates about the output shaft 23.

As shown in FIG. 2, the gear housing 22 has an outlet 20*b* at a rear portion. When the electric motor 21 is driven, a fan attached to a motor shaft rotates. Thus, cooling air flows inside the motor housing 20 from the inlet 20*a* toward the outlet 20*b*. The cooling air cools the electric motor 21.

As shown in FIG. 2, a controller housing 27 with a rectangular box shape is located on the machine body 10. The controller housing 27 accommodates a controller 28. The controller 28 includes a shallow, substantially rectangular prism case, and a control substrate accommodated in the case and molded with resin.

The controller 28 mainly includes, for example, a control circuit, a driving circuit, and an auto-stop circuit for controlling the operation of the electric motor 21. The control circuit includes a microcomputer that transmits control signals to the electric motor 21 based on the position information about a rotor of the electric motor 21. The driving circuit includes a field-effect transistor (FET) that switches the current from the electric motor 21 based on the control signals received from the control circuit. The auto-stop circuit disconnects the power supply to the electric motor 21 to avoid overdischarge or overcharge in accordance with the detection result of the state of a battery pack 26 as described later.

As shown in FIG. 2, the machine body 10 includes a battery mount 25 in a rear portion of the motor housing 20. The mount surface of the battery mount 25 extends in a direction substantially perpendicular to the longitudinal direction of the motor housing 20. The battery mount 25 receives the battery pack 26 with a substantially rectangular box shape in a detachable manner through sliding. The battery pack 26 is, for example, a lithium ion battery with an output voltage of 36 V. The battery pack 26 is detachable from the battery mount 25 and is repeatedly rechargeable by a separately prepared recharger. The battery pack 26 is also usable as a power source for another rechargeable power tool such as a screwdriver or an electric drill.

As shown in FIG. 3, a handle unit 30 is located at an upper front of the machine body 10. The handle unit 30 is located on the right of the stationary cover 12. The handle unit 30 includes an operation handle 31. The operation handle 31 has a loop shape extending in the lateral direction. A switch lever 32 is located on the inner circumference of the operation handle 31. The user grasping the operation handle 31 can pull the switch lever 32 with fingers hooked around the switch lever 32. Pulling the switch lever 32 activates the electric motor 21. A lock-off button 33 is located at an upper portion of the operation handle 31. Pressing the lock-off button 33 allows the user to pull the switch lever 32. This avoids unintended activation of the electric motor 21.

As shown in FIG. 3, an illuminator switch 34 is located on the surface nearer the inner circumference of the operation handle 31 and facing the switch lever 32. Pressing the illuminator switch 34 turns on or off LEDs 72 (refer to FIG. 4) in an illuminator 60 at an upper front of the stationary cover 12. The illuminator 60 will be described in detail later.

As shown in FIGS. 1 and 4, a turntable fixing unit 45 is located in a lower portion of the table extension 5. A grip unit 46 is located in front of the table extension 5. The grip unit 46 has an uneven circumference to facilitate gripping and rotating with a user. The user grips the grip unit 46 and horizontally rotates the turntable 4 with respect to the base 2.

A fixing rod 47 extends from the grip unit 46 to the inner rear of the table extension 5. The fixing rod 47 is supported through screw engagement inside the table extension 5. Rotating the grip unit 46 about the fixing rod 47 displaces the fixing rod 47 in the front-rear direction. Displacing the fixing rod 47 rearward locks the turntable 4 onto the base 2 at a predetermined miter angle. Displacing the fixing rod 47 frontward unlocks the turntable 4 from the base 2.

As shown in FIGS. 1 and 4, a positive lock unit 50 is located in a lower portion of the table extension 5. The positive lock unit 50 includes an unlock lever 51 and a positioning pin 52. The unlock lever 51 is located in a front portion of the table extension 5 and at the upper rear of the grip unit 46. The positioning pin 52 is coupled with the unlock lever 51 and extends into the inner rear of the table extension 5. The positioning pin 52 is located on substantially the same level as the miter scale plate 7. The positioning pin 52 is normally urged rearward. The rear end of the positioning pin 52 urged rearward is receivable in the positioning recesses 7*b*. The turntable 4 rotated horizontally by gripping the grip unit 46 causes the positioning pin 52 to move into any of the multiple positioning recesses 7*b*. Thus, the turntable 4 is fixed in position at a predetermined miter angle corresponding to the positioning recess 7*b*. Pressing the unlock lever 51 displaces the positioning pin 52 forward against the urging force. The rear end of the positioning pin 52 is thus disengaged from the positioning recess 7*b*.

Figure 5:
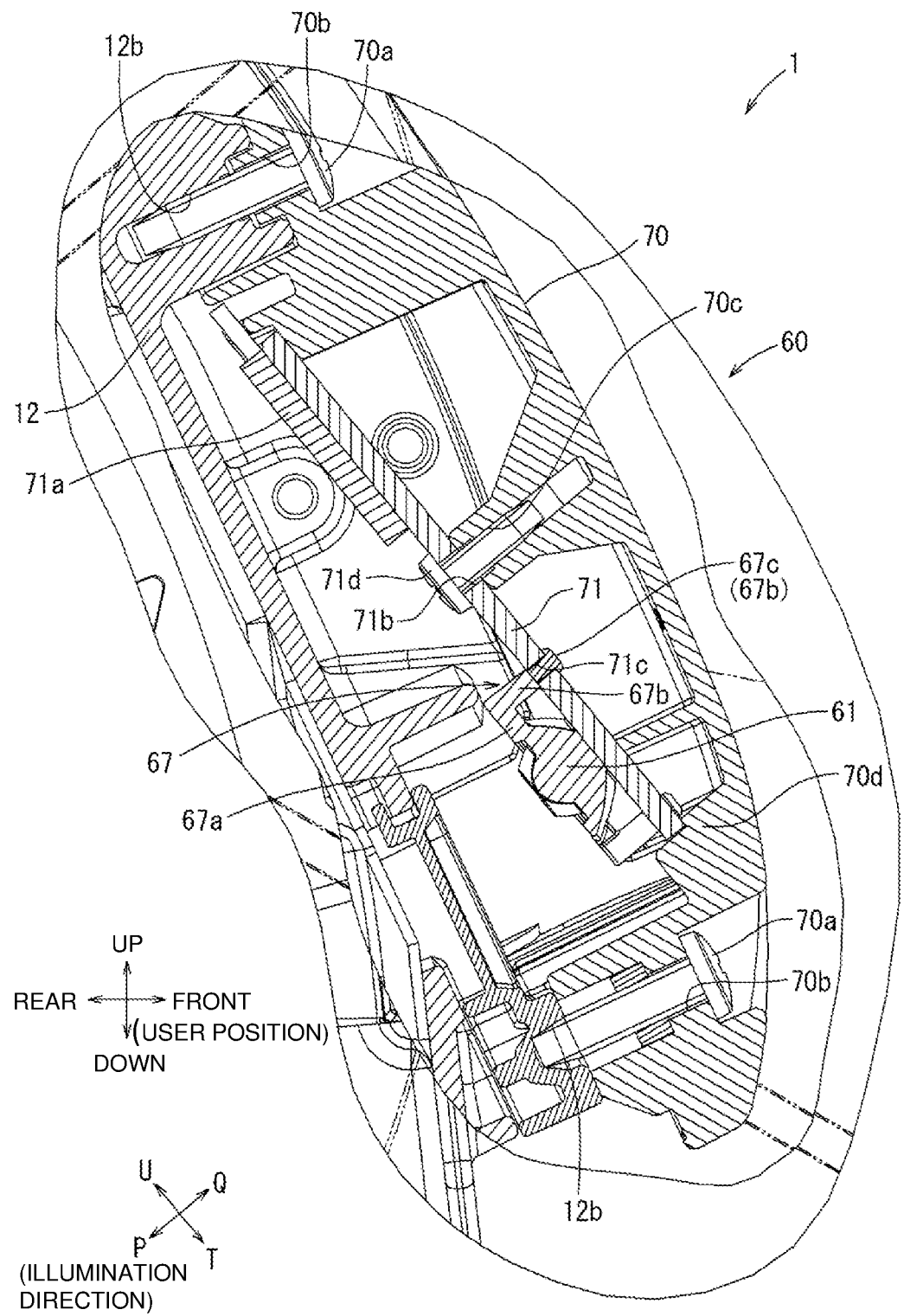
FIG. 5 is a partially enlarged vertical sectional view of an illuminator when the machine body is moved downward from the top dead center at a predetermined angle K.

As shown in FIGS. 4 and 5, the illuminator 60 is located in the upper front portion of the stationary cover 12 on the inner circumference. The illuminator 60 includes two LEDs 72 serving as light sources, a substrate 71, and an illuminator cover 70. The two LEDs 72 are located on the substrate 71. The illuminator cover 70 supports the substrate 71 and is attached to the stationary cover 12. The illuminator 60 includes a lens coupler 61. The lens coupler 61 changes the illumination direction of the LEDs 72. The illuminator 60 is located radially outward from the cutting tool 11 and emits light toward the cutting tool 11. The illuminator cover 70 extends in the circumferential direction of the stationary cover 12 along the circumferential surface of the stationary cover 12. The illuminator cover 70 has a through-hole 70b. The through-hole 70b extends through the illuminator cover 70 in the radial direction of the stationary cover 12. A fastening bolt 70a is received in the through-hole 70b and is fastened to a threaded hole 12b in the stationary cover 12. Thus, the illuminator cover 70 is attached to the stationary cover 12.

Figure 7:
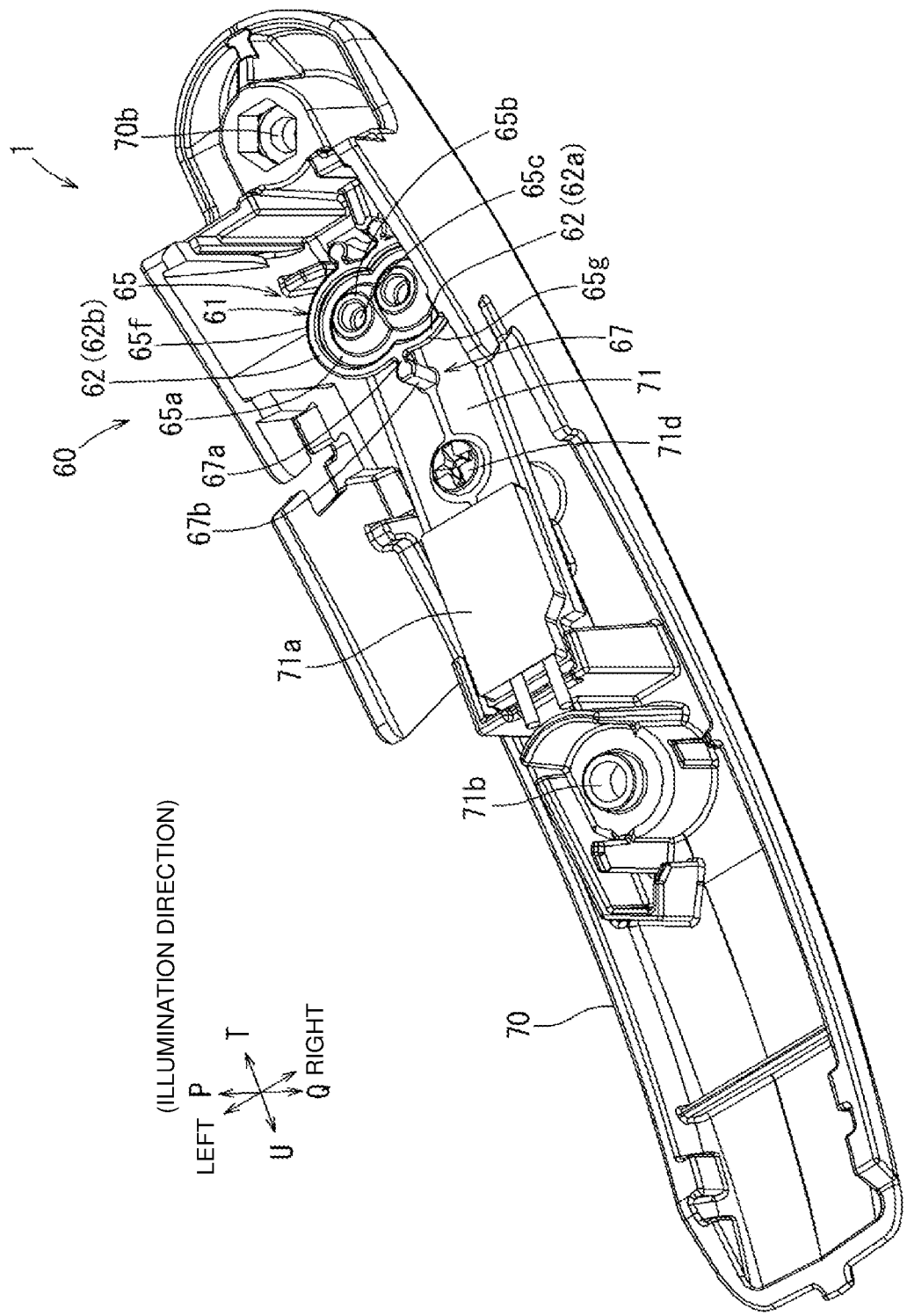
FIG. 7 is a perspective view of an illuminator with components assembled together.
Figure 9:
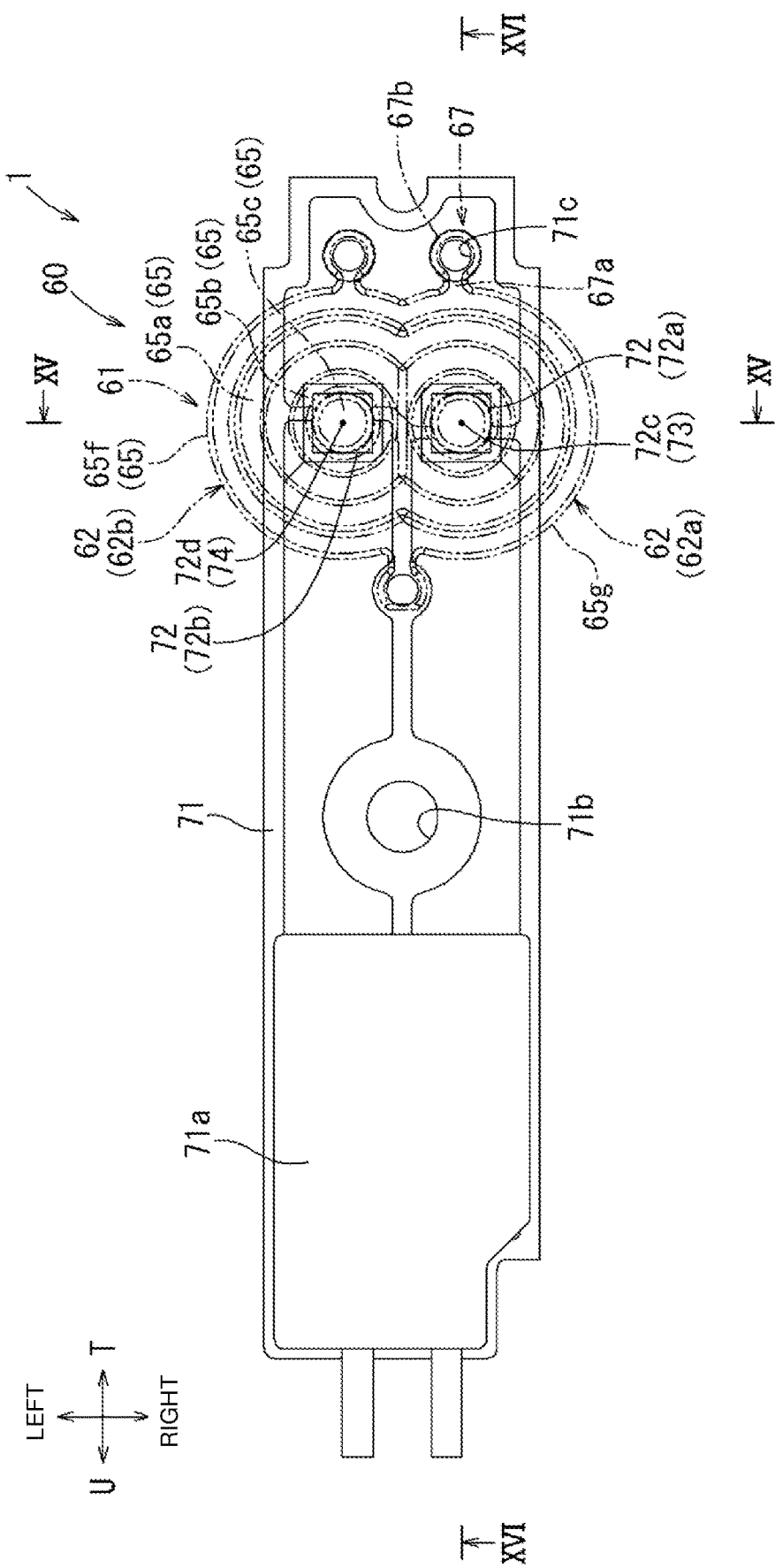
FIG. 9 is a plan view of the condensing lens and the LED substrate viewed from an emission surface.

As shown in FIGS. 5, 7, and 9, the substrate 71 is a rectangular plate formed from aluminum. The substrate 71 receives the two LEDs 72 and an LED controller 71a. The LED controller 71a turns on or off the two LEDs 72 based on a command signal transmitted from the controller 28 (refer to FIG. 2). At the center portion, the substrate 71 has a through-hole 71b that extends through the substrate 71 in the thickness direction. The illuminator cover 70 has a threaded hole 70c on the inner circumference. The threaded hole 70c extends in the radial direction of the stationary cover 12. A fastening bolt 71d is received in the through-hole 71b and fastened to the threaded hole 70c. Thus, the substrate 71 is attached to the illuminator cover 70.

Figure 8:
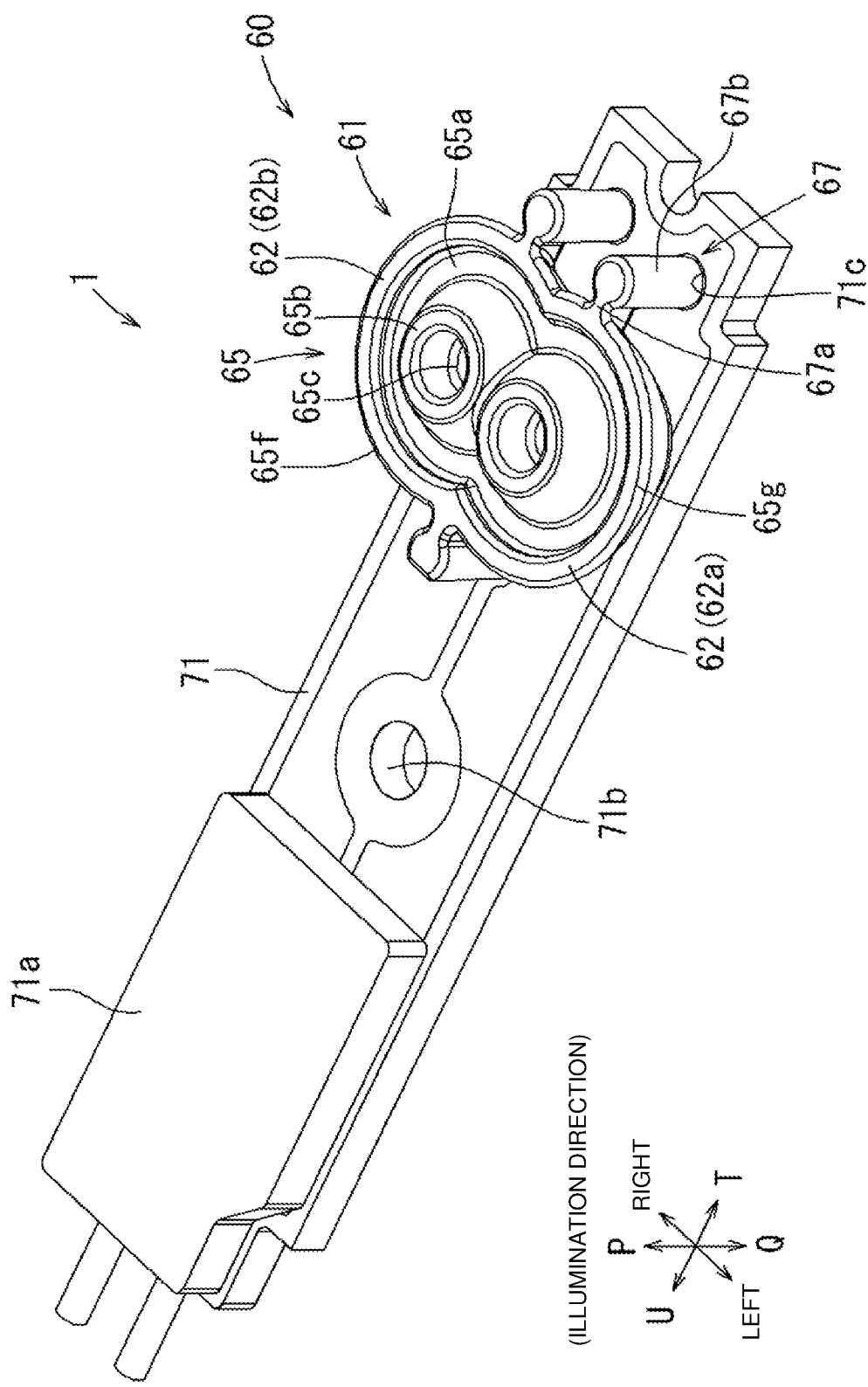
FIG. 8 is a perspective view of a condensing lens and an LED substrate.

As shown in FIG. 8, two lenses 62 are coupled to form a single lens coupler 61. The lens coupler 61 includes three legs 67. Each leg 67 includes a columnar pillar 67b. The substrate 71 has three through-holes 71c in a front portion. The through-holes 71c extend through the substrate 71 in the thickness direction. The pillars 67b are received in the through-holes 71c. The end of each pillar 67b is swaged (or rivetted) on the rear side (upper side) of the substrate 71 and radially enlarged to form an enlarged-diameter portion 67c. With the enlarged-diameter portion 67c, the lens coupler 61 cannot be removed from the substrate 71 (refer to FIG. 16). Thus, the lens coupler 61 is attached to the substrate 71.

Figure 10:
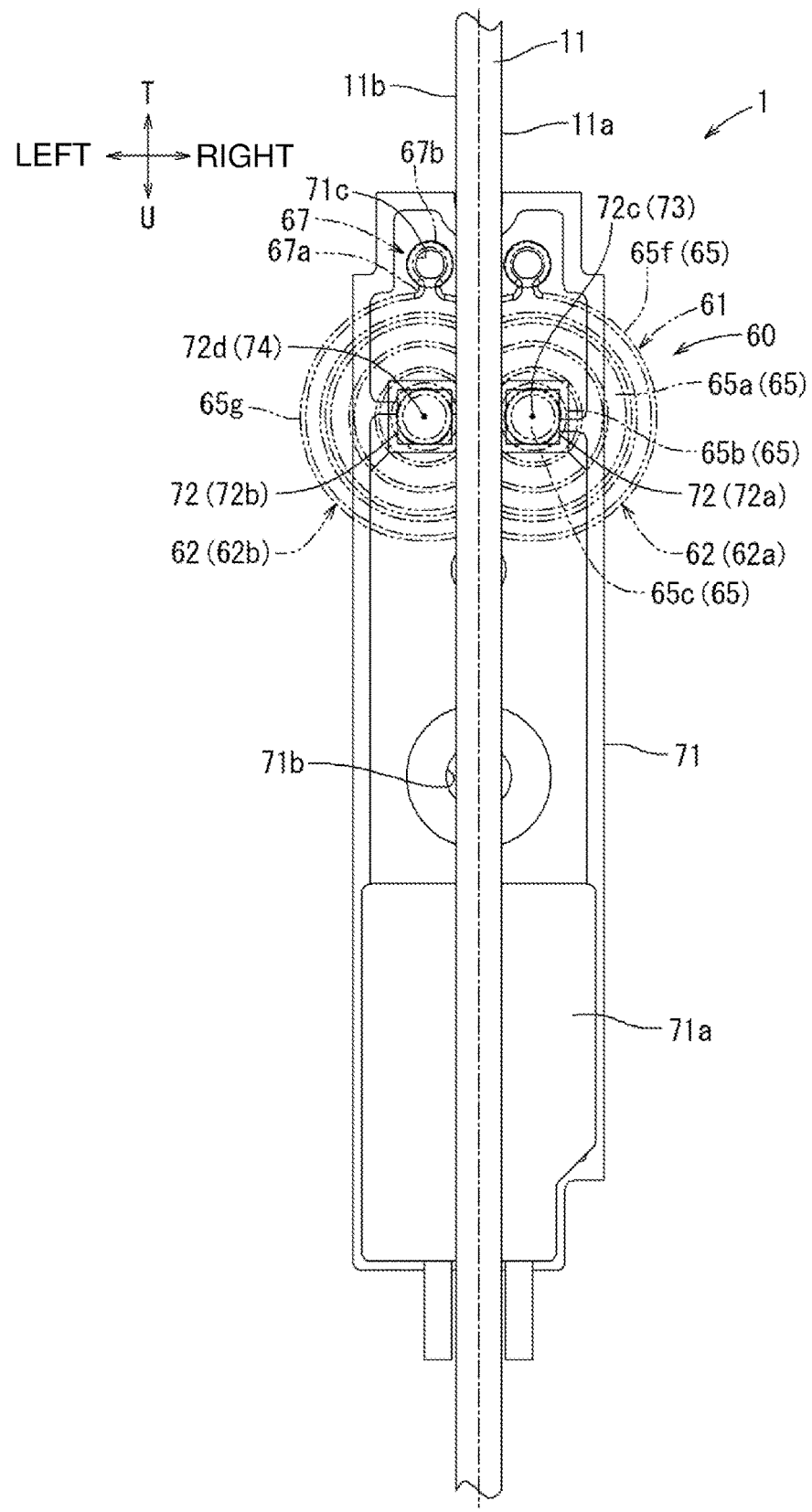
FIG. 10 is a bottom view showing the positional relationship between the cutting tool, an LED, and the condensing lens.

As shown in FIG. 10, the illuminator 60 includes the two LEDs 72 and the two lenses 62. The two LEDs 72 include a first light source 72a and a second light source 72b. The two lenses 62 include a first lens 62a and a second lens 62b. A first light source center 72c of the first light source 72a is located on the right of an imaginary plane extending from a right side surface 11a of the cutting tool 11. A second light source center 72d of the second light source 72b is located on the left of an imaginary plane extending from a left side surface 11b of the cutting tool 11. The first light source 72a and the second light source 72b are located at the same position in the front-rear direction. The first lens 62a is centered on a first center axis 73. The first center axis 73 includes the first light source center 72c and is perpendicular to the surface of the first light source 72a. The second lens 62b is centered on a second center axis 74. The second center axis 74 includes the second light source center 72d and is perpendicular to the surface of the second light source 72b. The first center axis 73 and the second center axis 74 extend in the same direction.

As shown in FIGS. 11 to 14, the second lens 62b is laterally symmetrical with the first lens 62a. One of the similar structures of the first lens 62a and the second lens 62b will be described in detail below.

The first lens 62a has a substantially conical shape with a diameter increasing from an incidence surface 64 toward an emission surface 65. A first incidence surface 64d and a first emission surface 65d of the first lens 62a each have an arc-shaped circumference centered on the first center axis 73. A second incidence surface 64e and a second emission surface 65e of the second lens 62b each have an arc-shaped circumference centered on the second center axis 74.

Figure 13:
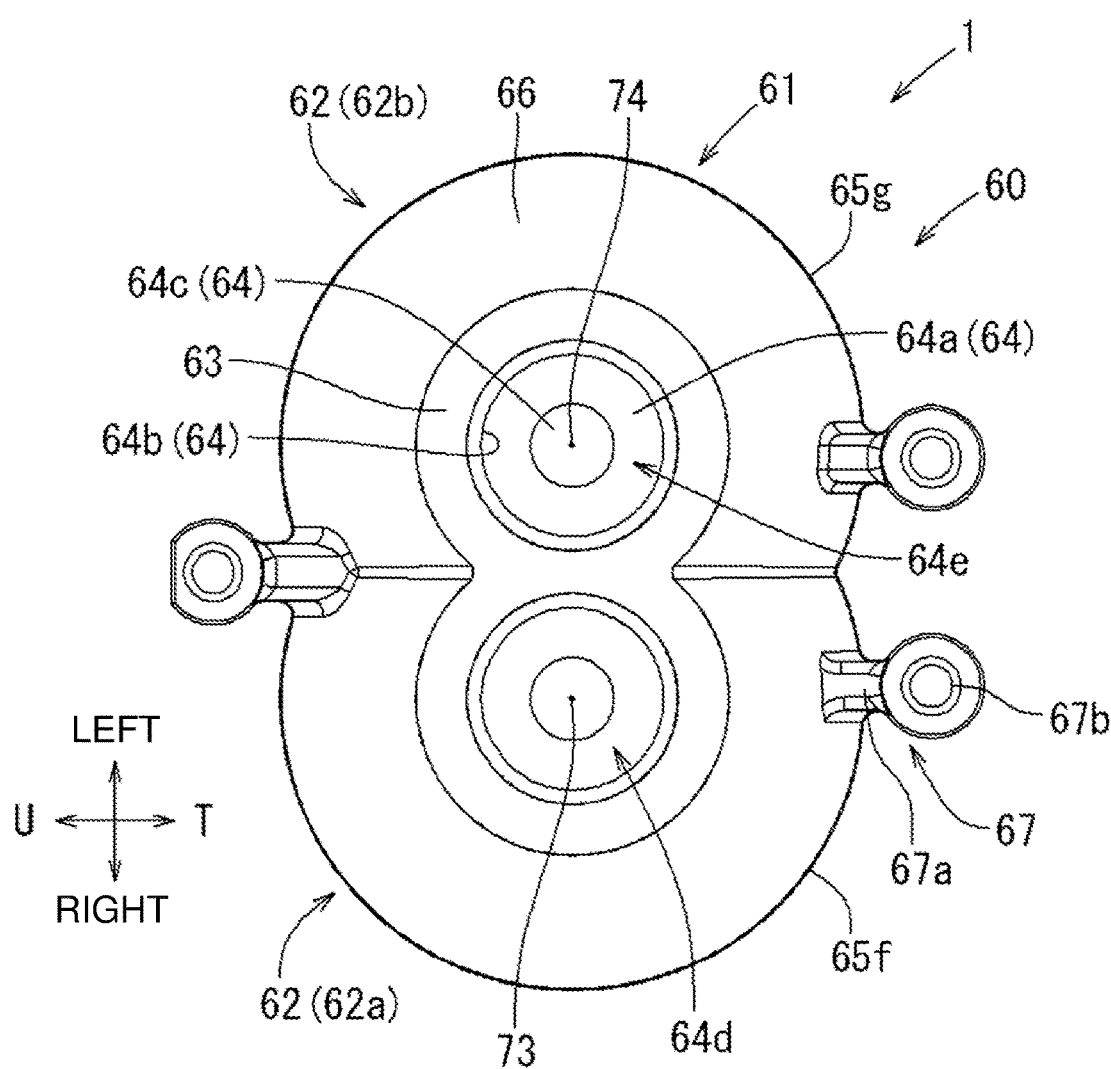
FIG. 13 is a plan view of the condensing lens viewed from an incidence surface.
Figure 15:
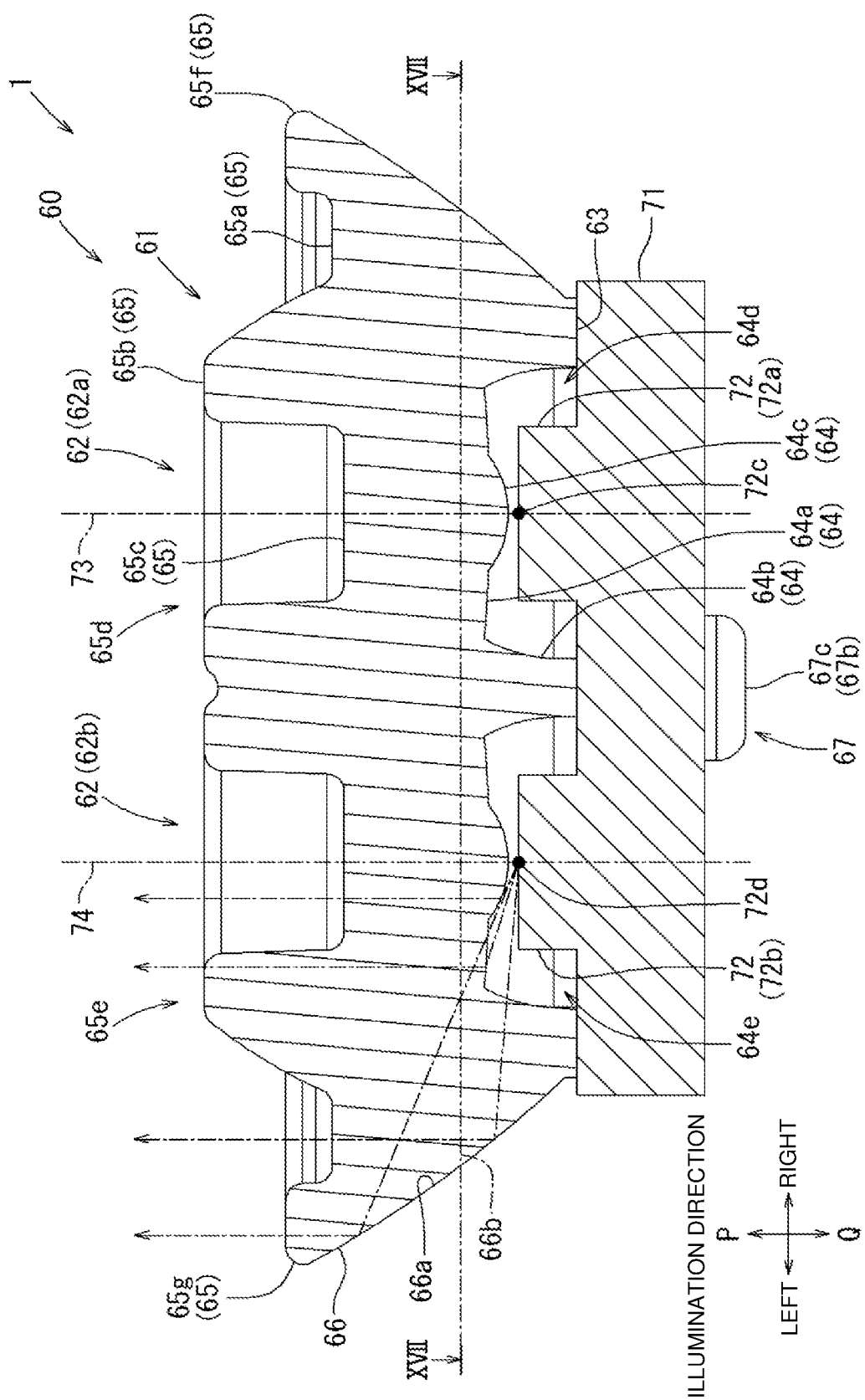
FIG. 15 is a cross-sectional view taken along line XV-XV in FIG. 9.

As shown in FIGS. 13 and 15, the first lens 62a has a flat substrate contact surface 63 at the end face of the incidence surface 64. The substrate contact surface 63 is in contact with the surface of the substrate 71. The incidence surface 64 includes the first incidence surface 64d nearer the first lens 62a and the second incidence surface 64e nearer the second lens 62b. The first incidence surface 64d has an incidence surface recess 64a recessed from the substrate contact surface 63 in the axial direction of the first center axis 73. The incidence surface recess 64a has a substantially cylindrical shape centered on the first center axis 73. The first light source 72a is accommodated in the incidence surface recess 64a with the first light source center 72c on the first center axis 73. The substrate 71 placed into contact with the substrate contact surface 63 closes the incidence surface recess 64a accommodating the first light source 72a.

As shown in FIG. 15, the second light source 72b is accommodated in the incidence surface recess 64a nearer the second lens 62b with the second light source center 72d located on the second center axis 74. The substrate 71 placed into contact with the substrate contact surface 63 closes the incidence surface recess 64a accommodating the second light source 72b. The incidence surface recess (first incidence surface recess) 64a nearer the first lens 62a and the incidence surface recess (second incidence surface recess) 64a nearer the second lens 62b are separated by the substrate contact surface 63 between them.

As shown in FIG. 15, the incidence surface recess 64a has a side surface 64b at least partially having a spherical shape centered on the first light source center 72c. In other words, the side surface 64b at least partially has, in a cross section including the first center axis 73, an arc shape centered on the first light source center 72c. The arc-shaped cross section of the side surface 64b is mostly located below the surface of the first light source 72a. The incidence surface recess 64a has a spherical protrusion 64c on its bottom surface. The spherical protrusion 64c has a convex shape centered on the first center axis 73 and protruding toward the first light source 72a. The incidence surface recess 64a, the side surface 64b, and the spherical protrusion 64c are included in the incidence surface 64 through which light from the LEDs 72 enters the lenses 62.

Figure 14:
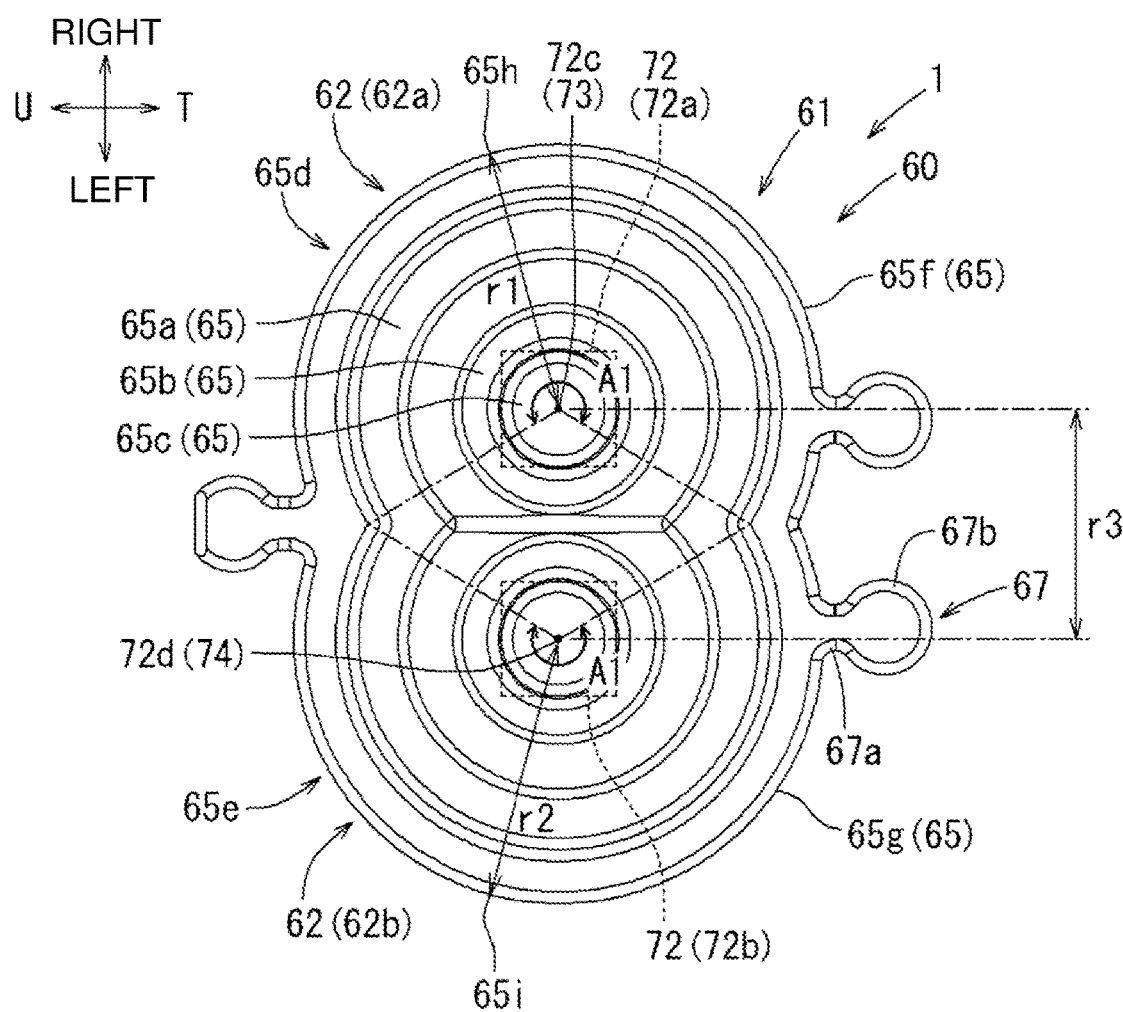
FIG. 14 is a plan view of the condensing lens viewed from the emission surface.

As shown in FIG. 14, the emission surface 65 includes the first emission surface 65d nearer the first lens 62a and the second emission surface 65e nearer the second lens 62b. The first emission surface 65d includes an arc-shaped first circumference 65f centered on the first center axis 73. A first outermost portion 65h on the first circumference 65f is located farthest from and at a first distance r1 from the first center axis 73. Any point on the arc-shaped first circumference 65f corresponds to the first outermost portion 65h.

The second emission surface 65e has an arc-shaped second circumference 65g centered on the second center axis 74. A second outermost portion 65i on the second circumference 65g is located farthest from and at a second distance r2 from the second center axis 74. Any point on the arc-shaped second circumference 65g corresponds to the second outermost portion 65i.

As shown in FIG. 14, a distance r3 between the first center axis 73 and the second center axis 74 is shorter than the sum of the first distance r1 and the second distance r2. When viewed in the direction of the first center axis 73, the first emission surface 65d and the second emission surface 65e form a shape including the two arc shapes partially overlapping at the center. The first circumference 65f and the second circumference 65g cross each other at their ends. The first circumference 65f has an arc shape centered on the first center axis 73 with a central angle A1. The second circumference 65g has an arc shape centered on the second center axis 74 with the central angle A1. The central angle A1 is greater than 180° and less than 360°.

As shown in FIGS. 14 and 15, the first lens 62a has an emission surface protrusion 65b. The emission surface protrusion 65b protrudes in the axial direction of the first center axis 73 at a position radially inward from the first circumference 65f. The emission surface protrusion 65b has a substantially cylindrical shape centered on the first center axis 73. The outer circumferential surface of the emission surface protrusion 65b has a substantially spherical shape centered on a predetermined point on the first center axis 73. The inner circumferential surface of the emission surface protrusion 65b extends in the axial direction of the first center axis 73.

The first lens 62a has a center recess 65c. The center recess 65c is recessed in the axial direction of the first center axis 73 at a position radially inward from the emission surface protrusion 65b. The center recess 65c has a cylindrical shape centered on the first center axis 73 when viewed in the axial direction of the first center axis 73. In other words, the center recess 65c is centered on the axis of the emission surface protrusion 65b. The bottom surface of the center recess 65c is perpendicular to the first center axis 73.

As shown in FIGS. 14 and 15, the first lens 62a has an arc-shaped recess 65a. The arc-shaped recess 65a is recessed in the axial direction of the first center axis 73 between the first circumference 65f and the emission surface protrusion 65b. The arc-shaped recess 65a is centered on the first center axis 73 when viewed in the axial direction of the first center axis 73. The arc-shaped recess 65a surrounds the circumference of the emission surface protrusion 65b. The emission surface protrusion 65b, the center recess 65c, and the arc-shaped recess 65a are included in an emission surface 65 through which light from the LEDs 72 is emitted.

Figure 12:
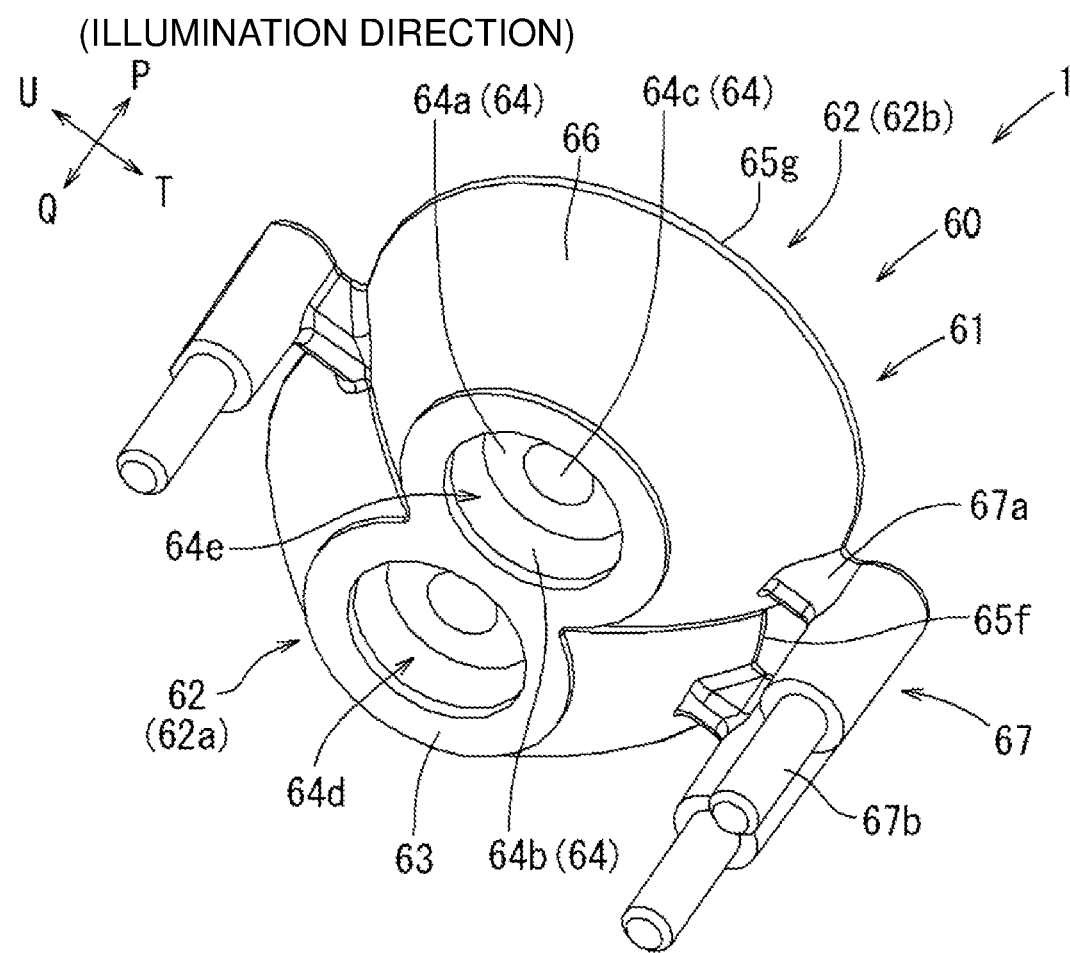
FIG. 12 is a perspective view of the condensing lens.

As shown in FIGS. 12 and 15, the first lens 62a has a substantially conical circumferential surface 66. The circumferential surface 66 connects the circumference of the substrate contact surface 63 with the first circumference 65f. The circumferential surface 66 includes an outer reflection surface 66a that reflects light inside the first lens 62a in the first lens 62a. The outer reflection surface 66a has a diameter that is centered on the first center axis. The diameter increases from the first incidence surface 64d toward the first emission surface 65d. The outer reflection surface 66a has a convex shape protruding outward in a cross section including the first center axis 73.

Figure 17:
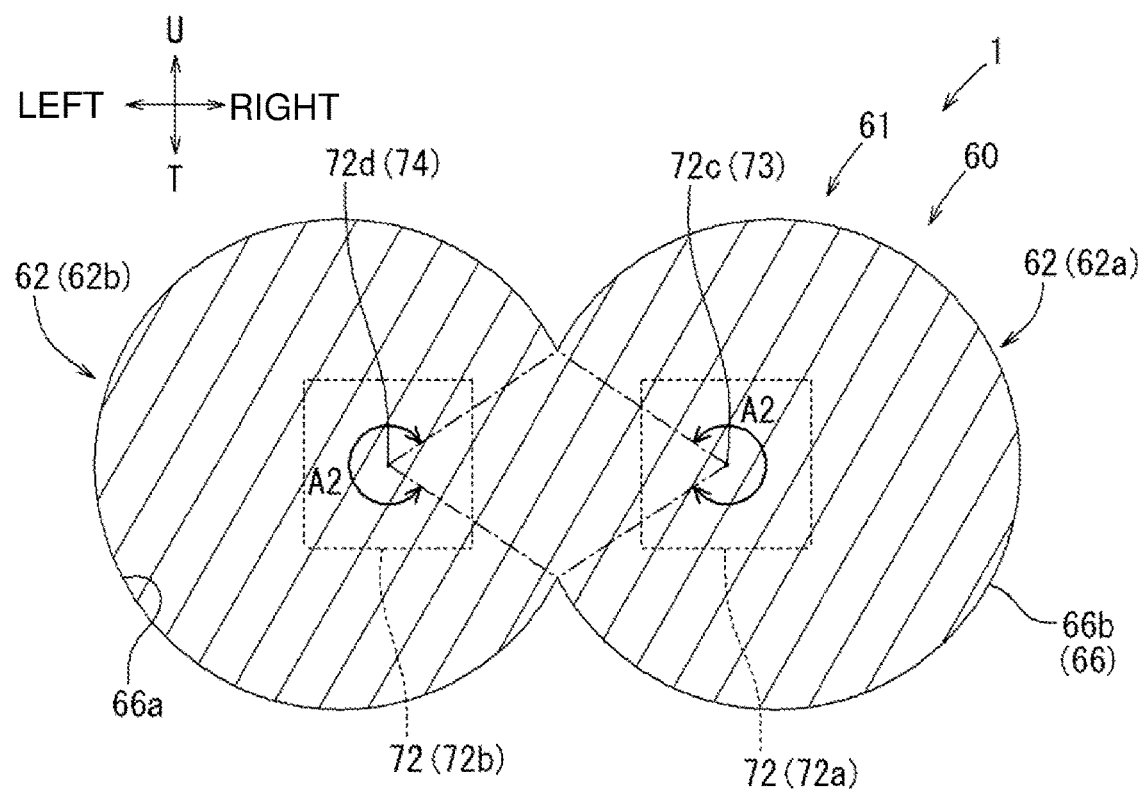
FIG. 17 is a cross-sectional view taken along line XVII-XVII in FIG. 15.

In a cross section taken perpendicular to the first center axis 73, as shown in FIG. 17, the outer reflection surface 66a is an arc-shaped circumference that is a cross-sectional arc 66b. In a cross section taken at any position between the first incidence surface 64d and the first emission surface 65d (refer to FIG. 15), the cross-sectional arc 66b has an arc shape centered on the first center axis 73 with a central angle A2. The central angle A2 is greater than 180° and less than 360°.

As shown in FIG. 15, light from the second light source center 72d of the second light source 72b enters the lens 62 through the bottom surface of the incidence surface recess 64a, the side surface 64b, or the spherical protrusion 64c. Light incident through the spherical protrusion 64c is refracted in the axial direction of the second center axis 74. The light is then emitted directly in the axial direction of the second center axis 74 from the bottom surface of the center recess 65c. Light incident through the bottom surface of the incidence surface recess 64a is refracted twice, or more specifically, at the bottom surface of the incidence surface recess 64a and at the outer circumferential surface of the emission surface protrusion 65b. The light is emitted through the outer circumferential surface of the emission surface protrusion 65b in the axial direction of the second center axis 74. Light incident through the side surface 64b travels in the direction normal to the side surface 64b and is reflected from the outer reflection surface 66a in the axial direction of the second center axis 74. The light is then directly emitted in the axial direction of the second center axis 74 from the arc-shaped recess 65a or an area between the arc-shaped recess 65a and the second circumference 65g. Thus, the light from the second emission surface 65e is aligned in the axial direction of the second center axis 74. Similarly, light from the first light source 72a emitted through the first emission surface 65d is also aligned in the axial direction of the first center axis 73.

As shown in FIGS. 12 and 14, each leg 67 includes an externally extending portion 67a. The externally extending portion 67a extends from the first circumference 65f or the second circumference 65g laterally from the lenses 62. Each pillar 67b extends from the distal end of the externally extending portion 67a in a direction from the emission surface 65 toward the incidence surface 64. Thus, the legs 67 are located outside the path of light passing through the lenses 62.

Figure 6:
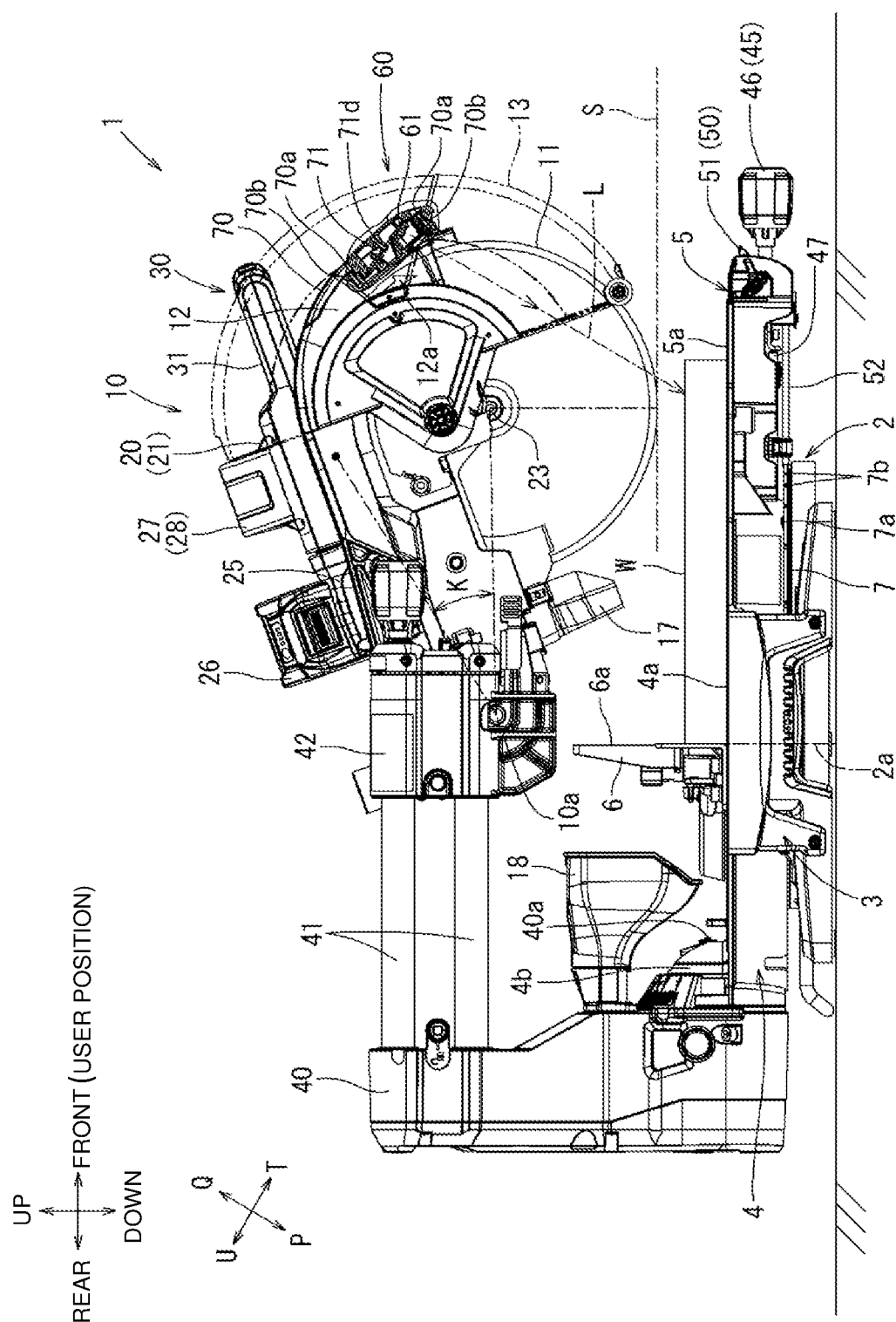
FIG. 6 is a left side view of the cutting machine when the machine body is moved downward from the top dead center at the predetermined angle K, including a partial vertical section.

As shown in FIG. 4, light emitted through the emission surface 65 (refer to FIG. 15) of the lens coupler 61 is applied to the cutting tool 11 from above. When the machine body 10 is at a top dead center, a radiated ray L is inclined slightly rearward while traveling downward. In a horizontal imaginary plane S including the bottom end of the cutting tool 11, the radiated ray L passes in front of a point immediately below the output shaft 23 of the cutting tool 11. As shown in FIG. 6, the machine body 10 is swung downward at a predetermined angle K from the top dead center to a predetermined position between the top dead center and the bottom dead center to move the bottom end of the cutting tool 11 nearer the workpiece W. At this time, in the imaginary plane S, the radiated ray L moves nearer the point immediately below the output shaft 23 of the cutting tool 11, and passes closely in front of the point immediately below the output shaft 23. The imaginary plane S is parallel to the upper surface of the workpiece W and is the same plane as the upper surface of the workpiece W when the bottom end of the cutting tool 11 comes into contact with the upper surface of the workpiece W.

As shown in FIG. 4, the cutting machine 1 includes the machine body 10 including the disc-shaped cutting tool 11, and the illuminator 60 that emits light from the radially outer portion of the cutting tool 11 toward the cutting tool 11. As shown in FIG. 10, the illuminator 60 includes the first light source 72a and the second light source 72b located across an imaginary plane including the cutting tool 11, and the first lens 62a and the second lens 62b. As shown in FIG. 15, the first lens 62a includes the first incidence surface 64d on which light from the first light source 72a is incident, and the first emission surface 65d through which light is emitted. The second lens 62b includes the second incidence surface 64e on which light from the second light source 72b is incident, and the second emission surface 65e through which light is emitted. As shown in FIG. 14, the first emission surface 65d has the first outermost portion 65h located farthest and at the first distance r1 from the first center axis 73 including the first light source center 72c of the first light source 72a and perpendicular to the first light source 72a. The second emission surface 65e has the second outermost portion 65i located farthest and at the second distance r2 from the second center axis 74 including the second light source center 72d of the second light source 72b and perpendicular to the second light source 72b. The distance r3 between the first center axis 73 and the second center axis 74 is shorter than the sum of the first distance r1 and the second distance r2.

Thus, light from the first light source 72a passes the first lens 62a and is emitted through the first emission surface 65d. Light from the second light source 72b passes the second lens 62b and is emitted through the second emission surface 65e. The distance r3 between the first center axis 73 and the second center axis 74 is shorter than the sum of the first distance r1 and the second distance r2, and the first emission surface 65d and the second emission surface 65e are located close to each other. Thus, the first emission surface 65d is nearer the right side surface 11a of the cutting tool 11. The second emission surface 65e is nearer the left side surface 11b of the cutting tool 11. The workpiece W is placed opposite to the illuminator with the cutting tool 11 in between. This structure reduces light emitted through the first emission surface 65d and the second emission surface 65e traveling between the cutting tool 11 and the workpiece W. This structure can thus clearly cast the shadow of the cutting tool 11 on the surface of the workpiece W.

Figure 11:
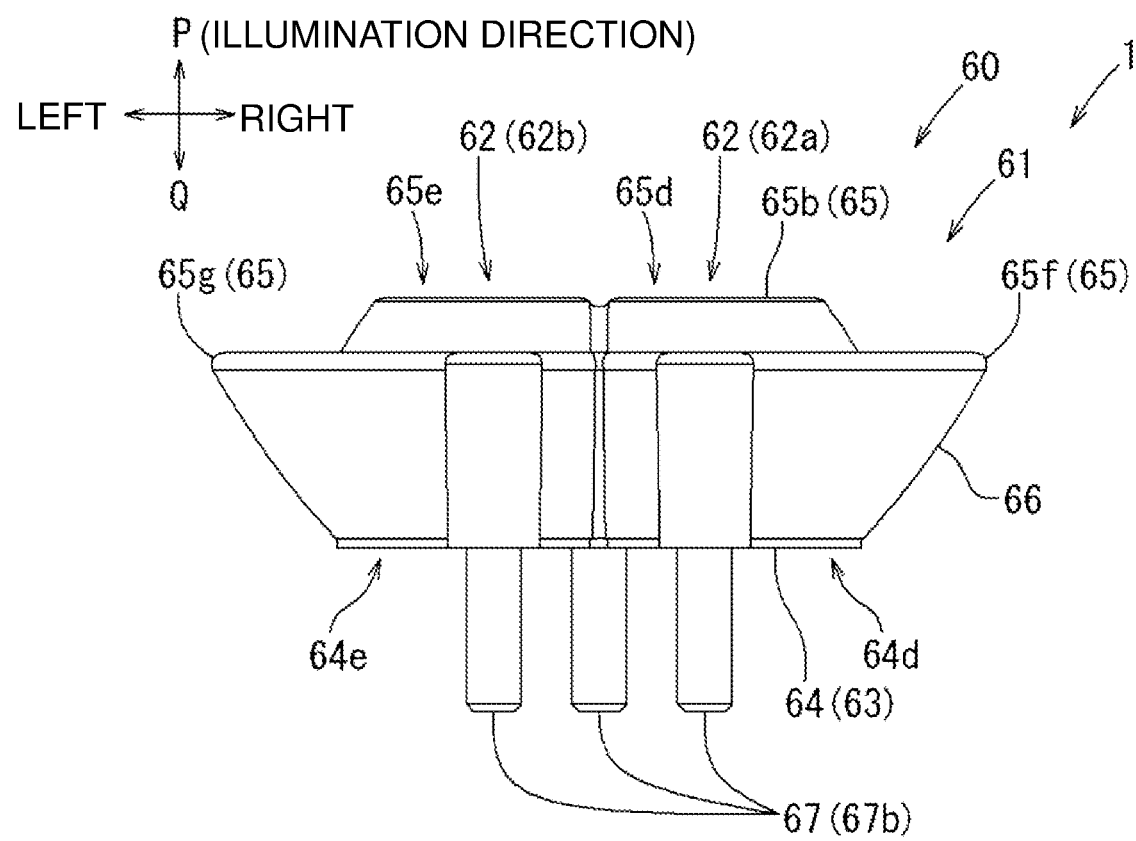
FIG. 11 is a side view of the condensing lens.

The first lens 62a and the second lens 62b are included in a single component of the lens coupler 61 as shown in FIG. 11. The single lens coupler 61 alone is attached to the illuminator 60, thus shortening the distance between the first light source 72a and the second light source 72b and also facilitating the attachment to the illuminator 60.

As shown in FIG. 14, the first emission surface 65d includes the arc-shaped first circumference 65f centered on the first center axis 73 and having a length extending over a range exceeding 180°. The second emission surface 65e includes the arc-shaped second circumference 65g centered on the second center axis 74 and having the length extending over a range exceeding 180°. The first circumference 65f and the second circumference 65g cross each other.

Thus, light emitted through the first emission surface 65d has less brightness unevenness in the circumferential direction of the first emission surface 65d. Light emitted through the second emission surface 65e has less brightness unevenness in the circumferential direction of the second emission surface 65e. Thus, an area on the surface of the workpiece W illuminated has less brightness unevenness. This structure can clearly cast the shadow of the cutting tool 11 on the workpiece W. This structure can also reduce the distance between the first center axis 73 and the second center axis 74. Thus, the distance between the first light source 72a and the second light source 72b can be reduced while the lenses 62 retain the shapes to clearly cast the shadow of the cutting tool 11 on the workpiece W.

As shown in FIG. 15, the first lens 62a has the outer reflection surface 66a that reflects, toward the first emission surface 65d, light incident through the first incidence surface 64d and passing through the first lens 62a. The outer reflection surface 66a has a convex shape separated farther from the first center axis 73 nearer the first emission surface 65d from the first incidence surface 64d, and curved outward in the cross section including the first center axis 73. Thus, light traveling from the first incidence surface 64d through the first lens 62a and out of the first lens 62a can be directed toward the first emission surface 65d at the outer reflection surface 66a. This structure can reduce an optical loss. This structure can also align the direction of light emitted through the first emission surface 65d and thus reduce uneven brightness of the illuminating light.

As shown in FIG. 15, the outer reflection surface 66a has the cross-sectional arc 66b centered on the first center axis 73 and having a length extending over a range exceeding 180° at any position from the first incidence surface 64d to the first emission surface 65d (refer to FIG. 17). Thus, the distance between the first light source 72a and the second light source 72b can be reduced while the lenses 62 retain the shapes to reduce uneven brightness of the illuminating light.

As shown in FIGS. 13 and 15, the first lens 62a has the incidence surface recess 64a on the first incidence surface 64d and the spherical protrusion 64c protruding toward the first light source 72a from the bottom surface of the incidence surface recess 64a. The incidence surface recess 64a can thus reduce the thickness of the first lens 62a in the axial direction of the first center axis 73. The spherical protrusion 64c can refract the light in the axial direction of the first center axis 73 without excessively increasing the thickness of the first lens 62a.

As shown in FIG. 15, the side surface 64b of the incidence surface recess 64a at least partially has an arc shape concentric with the first light source 72a in a cross section including the first center axis 73. Thus, light that passes a portion of the side surface 64b with an arc-shaped cross section travels in a direction substantially normal to the side surface 64b. Thus, light refraction is reduced in the portion of the side surface 64b with an arc-shaped cross section. The light can thus be evenly emitted through the first emission surface 65d.

As shown in FIG. 15, the first lens 62a has the incidence surface recess 64a on the first incidence surface 64d. The incidence surface recess 64a is closed with the substrate 71 to which the first light source 72a is attached. The second lens 62b includes the incidence surface recess 64a on the second incidence surface 64e. The incidence surface recess 64a nearer the second lens 62b is closed with the substrate 71 to which the second light source 72b is attached and separated from the incidence surface recess 64a nearer the first lens 62a. This structure can reduce a loss of light from the first light source 72a or the second light source 72b. This structure can also reduce interference between light from the first light source 72a and light from the second light source 72b. Thus, light can be efficiently emitted through the first and second emission surfaces 65d and 65e.

As shown in FIGS. 14 and 15, the first lens 62a has the emission surface protrusion 65b that protrudes at a position inward from the circumference of the first emission surface 65d and has a cylindrical shape on the inner circumference and the shape of a partial sphere on the outer circumference. The emission surface protrusion 65b can thus refract light emitted through the emission surface protrusion 65b in the extension direction of the first center axis 73. Thus, light emitted through the first emission surface 65d is aligned and can cast a clear shadow on the surface of the workpiece W.

As shown in FIGS. 14 and 15, the first lens 62a has the cylindrical emission surface protrusion 65b. The first lens 62a has the center recess 65c at the axial center of the emission surface protrusion 65b. This structure can reduce the thickness of the first lens 62a without changing the direction of light emitted through the first emission surface 65d. The illuminator 60 can thus have a smaller size.

As shown in FIGS. 14 and 15, the first emission surface 65d of the first lens 62a has the arc-shaped recess 65a surrounding the circumference of the emission surface protrusion 65b. This structure can thus reduce the thickness of the first lens 62a in a relatively wide area between the emission surface protrusion 65b and the first circumference 65*f* without changing the direction of light emitted through the first emission surface 65*d*. Thus, the illuminator 60 can have a smaller size and weight.

Figure 16:
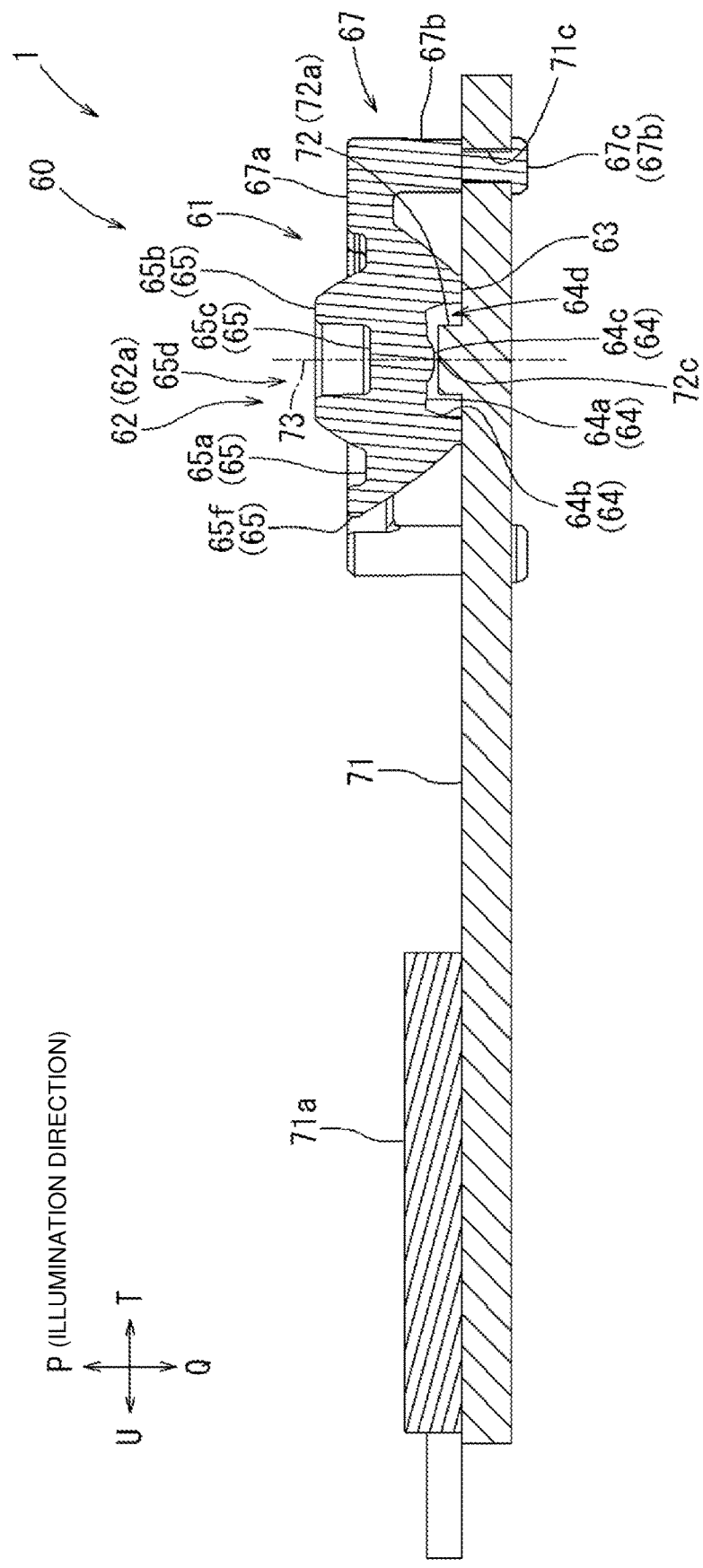
FIG. 16 is a cross-sectional view taken along line XVI-XVI in FIG. 9.

As shown in FIGS. 14 and 16, the first lens 62*a* includes the legs 67 extending sideward from the first circumference 65*f* of the first emission surface 65*d*. This structure can reduce leakage of light passing through the first lens 62*a* from the legs 67 and thus reduce a loss of light from the first light source 72*a*.

As shown in FIG. 4, the machine body 10 is vertically swingable about the vertical swing support shaft 10*a* with respect to the base 2 that receives the workpiece W. When the machine body 10 is at a top dead center, the illuminator 60 illuminates a front position farther from the vertical swing support shaft 10*a* than the position immediately below the output shaft 23 of the cutting tool 11 in the horizontal imaginary plane S including the bottom end of the cutting tool 11 and corresponding to the upper surface of the workpiece W. This structure can cast a shadow of the cutting tool 11 at a position easily viewable from the user in front of the cutting machine 1.

A second embodiment of the present disclosure will now be described with reference to FIGS. 18 to 22. A cutting machine 80 according to the second embodiment includes a lens coupler 82 in an illuminator 81 shown in FIG. 18, instead of the lens coupler 61 in the illuminator 60 shown in FIG. 11. The lens coupler 82 is a single component with two lenses 83, or more specifically, a first lens 83*a* and a second lens 83*b* connected together. The lens coupler 82 includes three legs 88. Each leg 88 includes a columnar pillar 88*b* receivable in the corresponding through-hole 71*c* (refer to FIG. 8) in the substrate 71.

Figure 22:
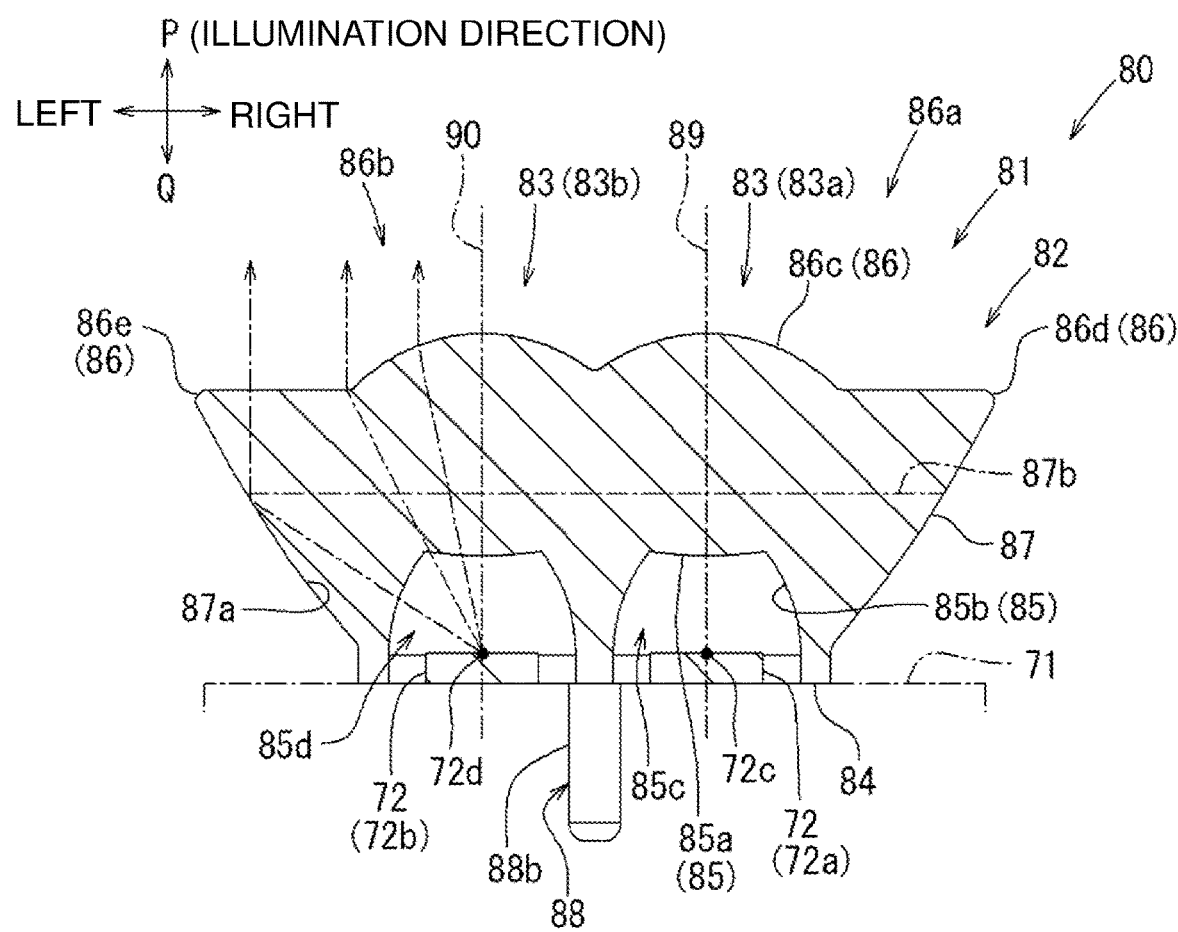
FIG. 22 is a cross-sectional view of an assembly of the condensing lens and an LED taken along line XXII-XXII in FIG. 20.

As shown in FIG. 22, the first lens 83*a* is centered on a first center axis 89. The first center axis 89 includes the first light source center 72*c* and is perpendicular to the surface of the first light source 72*a*. The second lens 83*b* is centered on a second center axis 90. The second center axis 90 includes the second light source center 72*d* and is perpendicular to the surface of the second light source 72*b*. The first and second center axes 89 and 90 extend in the same direction.

The first light source 72*a* and the second light source 72*b* are located with respect to the substrate 71 and the cutting tool 11 (refer to FIG. 10) in the same positional relationship as in the cutting machine 1 according to the first embodiment. The second lens 83*b* is laterally symmetrical with the first lens 83*a*. One of the structures of the first lens 83*a* and the second lens 83*b* similar to each other will be described in detail below.

Figure 18:
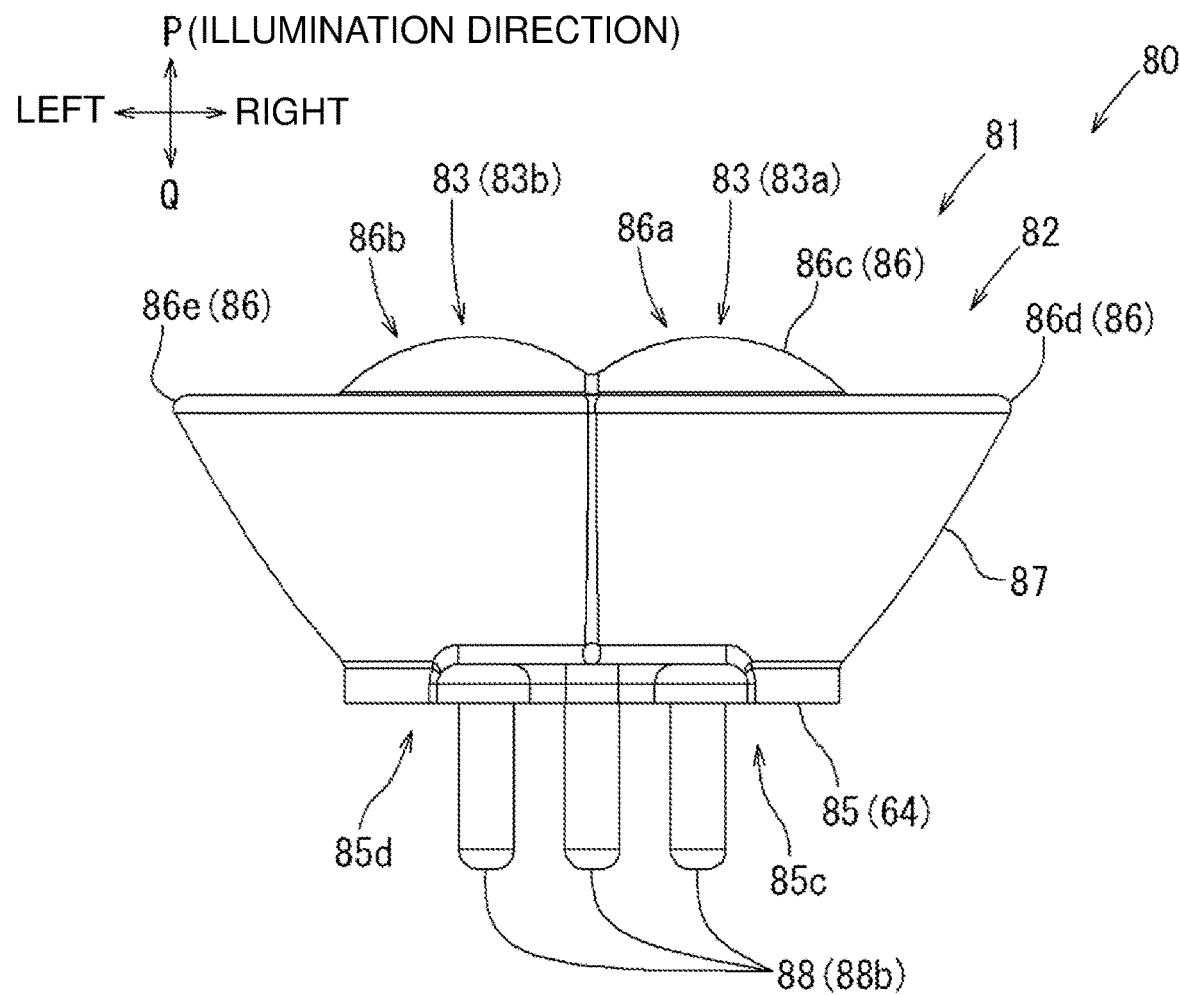
FIG. 18 is a side view of a condensing lens according to a second embodiment.

As shown in FIGS. 18 and 22, the first lens 83*a* has a substantially conical shape with a diameter increasing from an incidence surface 85 toward an emission surface 86. A first incidence surface 85*c* and a first emission surface 86*a* of the first lens 83*a* each have an arc-shaped circumference centered on the first center axis 89. A second incidence surface 85*d* and a second emission surface 86*b* of the second lens 83*b* each have an arc-shaped circumference centered on the second center axis 90.

Figure 19:
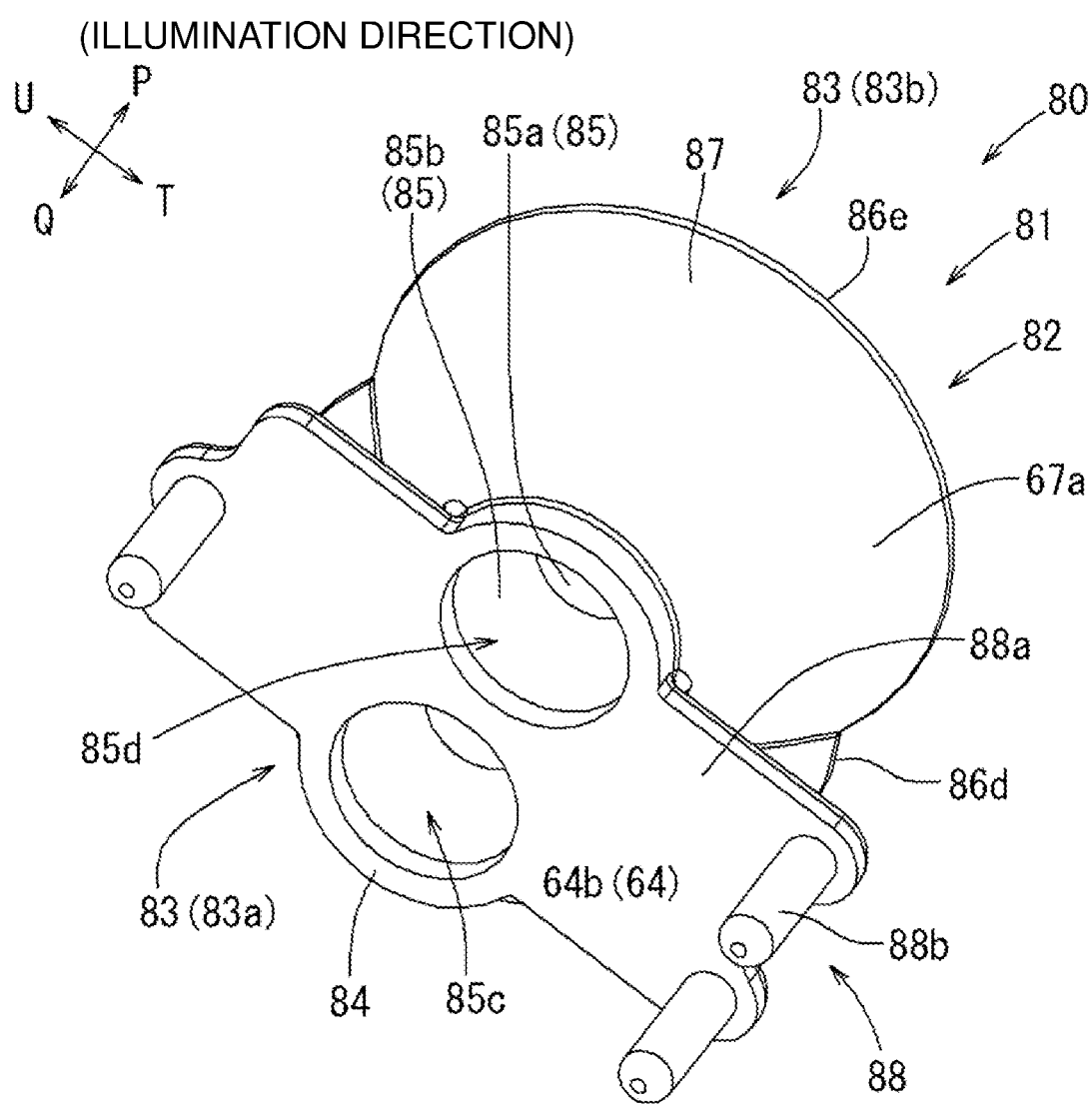
FIG. 19 is a perspective view of the condensing lens.

As shown in FIGS. 19 and 22, the first lens 83*a* has a flat substrate contact surface 84 at the end face of the incidence surface 85. The substrate contact surface 84 is in contact with the surface of the substrate 71. The incidence surface 85 includes the first incidence surface 85*c* nearer the first lens 83*a* and the second incidence surface 85*d* nearer the second lens 83*b*. The first incidence surface 85*c* includes an incidence surface recess 85*a* recessed from the substrate contact surface 84 in the axial direction of the first center axis 89. The incidence surface recess 85*a* has a substantially cylindrical shape centered on the first center axis 89. The first light source 72*a* is accommodated in the incidence surface recess 85*a* with the first light source center 72*c* on the first center axis 89.

As shown in FIG. 22, the second light source 72*b* is accommodated in the incidence surface recess 85*a* nearer the second lens 83*b* with the second light source center 72*d* located on the second center axis 90. The substrate 71 placed into contact with the substrate contact surface 84 closes the two incidence surface recesses 85*a* each accommodating the first light source 72*a* or the second light source 72*b*. The incidence surface recess (first incidence surface recess) 85*a* nearer the first lens 83*a* and the incidence surface recess (second incidence surface recess) 85*a* nearer the second lens 83*b* are separated by the substrate contact surface 84 between them.

As shown in FIG. 22, a side surface 85*b* of the incidence surface recess 85*a* at least partially has an arc shape centered on the first light source center 72*c* in a cross section including the first center axis 89. The arc-shaped cross section of the side surface 85*b* is mostly located below the surface of the first light source 72*a*. The bottom surface of the incidence surface recess 85*a* has the shape of a spherical protrusion centered on the first center axis 89 and protruding toward the first light source 72*a*. The incidence surface recess 85*a* and the side surface 85*b* are included in the incidence surface 85 through which light from the LEDs 72 enters the lenses 83.

Figure 21:
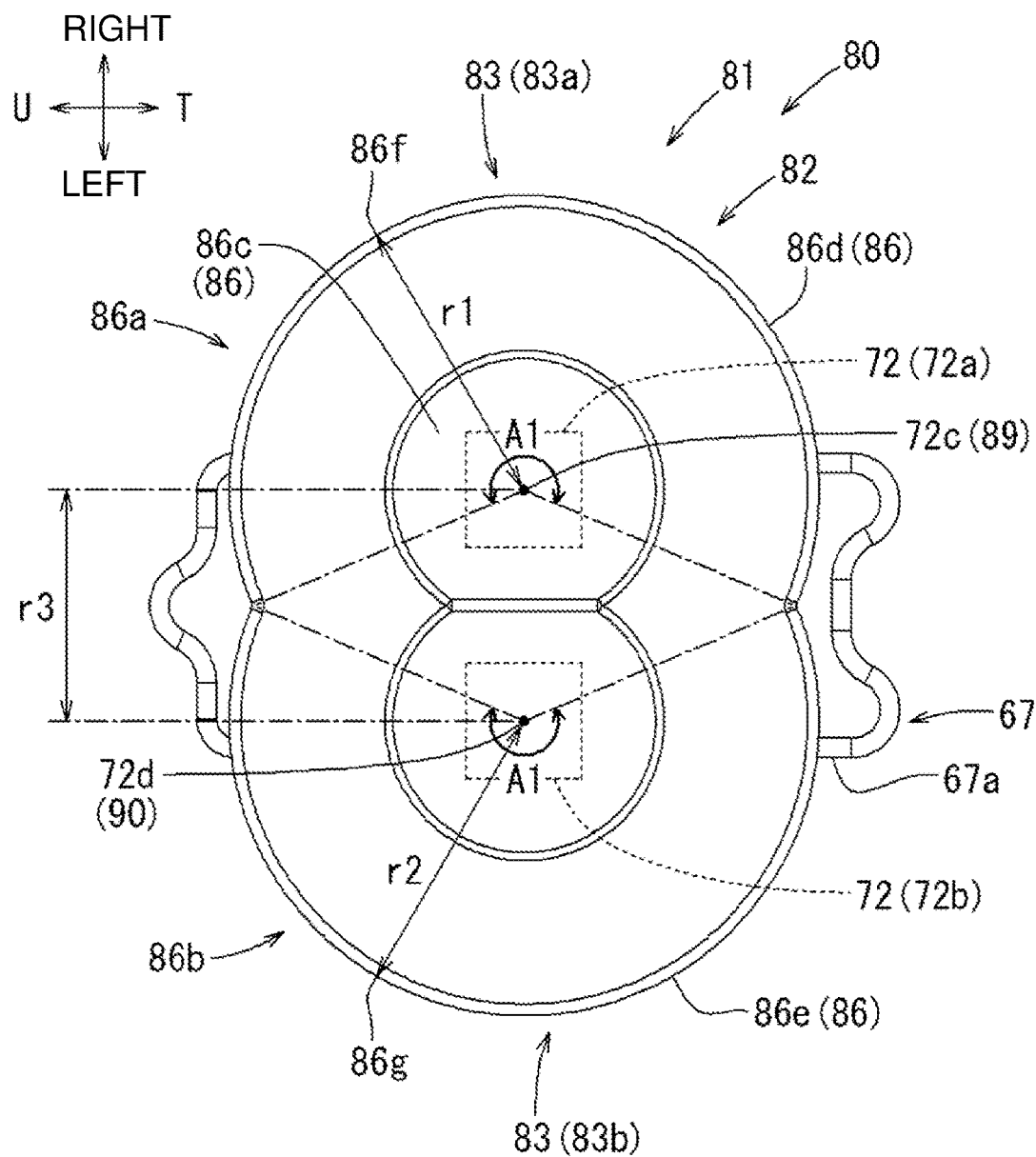
FIG. 21 is a plan view of the condensing lens viewed from an emission surface.

As shown in FIG. 21, the emission surface 86 includes the first emission surface 86*a* nearer the first lens 83*a* and the second emission surface 86*b* nearer the second lens 83*b*. The first emission surface 86*a* includes an arc-shaped first circumference 86*d* centered on the first center axis 89. A first outermost portion 86*f* on the first circumference 86*d* is located farthest from and at a first distance r1 from the first center axis 89. The second emission surface 86*b* includes an arc-shaped second circumference 86*e* centered on the second center axis 90. A second outermost portion 86*g* on the second circumference 86*e* is located farthest from and at a second distance r2 from the second center axis 90. Any point on the arc-shaped first circumference 86*d* and the arc-shaped second circumference 86*e* corresponds to the first outermost portion 86*f* and the second outermost portion 86*g*.

As shown in FIG. 21, a distance r3 between the first center axis 89 and the second center axis 90 is shorter than the sum of the first distance r1 and the second distance r2. When viewed in the direction of the first center axis 89, the first and second emission surfaces 86*a* and 86*b* has a shape including two arc shapes partially overlapping at the center. The first circumference 86*d* and the second circumference 86*e* cross each other at their ends. The first circumference 86*d* has an arc shape centered on the first center axis 89 with a central angle A1. The second circumference 86*e* has an arc shape centered on the second center axis 90 with the central angle A1. The central angle A1 is greater than 180° and less than 360°.

As shown in FIGS. 18 and 22, the first lens 83*a* has an emission surface protrusion 86*c*. The emission surface protrusion 86*c* protrudes in the axial direction of the first center axis 89 at a position radially inward from the first circumference 86*d*. The emission surface protrusion 86*c* has a spherical shape centered on a predetermined point on the first center axis 89. The emission surface protrusion 86*c* is included in the emission surface 86 through which light from the LEDs 72 is emitted.

As shown in FIGS. 18 and 22, the first lens 83*a* has a substantially conical circumferential surface 87. The circumferential surface 87 connects the circumference of the substrate contact surface 84 with the first circumference 86d. The circumferential surface 87 includes an outer reflection surface 87a that reflects light inside the first lens 83a. The outer reflection surface 87a has a diameter that is centered on the first center axis and increases from the first incidence surface 85c toward the first emission surface 86a. The outer reflection surface 87a has a convex shape protruding outward in a cross section including the first center axis 89. The outer reflection surface 87a has an arc-shaped circumference that is a cross-sectional arc 87b in a cross section perpendicular to the first center axis 89. The cross-sectional arc 87b has the same shape as the cross-sectional arc 66b shown in FIG. 17.

As shown in FIG. 22, light from the second light source center 72d of the second light source 72b enters the lens 83 through the bottom surface of the incidence surface recess 85a or the side surface 85b. Light incident through the bottom surface of the incidence surface recess 85a is refracted twice, or more specifically, at the bottom surface of the incidence surface recess 85a and at the outer circumferential surface of the emission surface protrusion 86c. The light is emitted through the outer circumferential surface of the emission surface protrusion 86c in the axial direction of the second center axis 90. Light incident through the side surface 85b travels in the direction normal to the side surface 85b and is reflected from the outer reflection surface 87a in the axial direction of the second center axis 90. The light is then directly emitted in the axial direction of the second center axis 90 from an area between the emission surface protrusion 86c and the second circumference 86e. Thus, the light emitted through the second emission surface 86b is aligned in the axial direction of the second center axis 90. Similarly, light from the first light source 72a emitted through the first emission surface 86a is also aligned in the axial direction of the first center axis 89.

Figure 20:
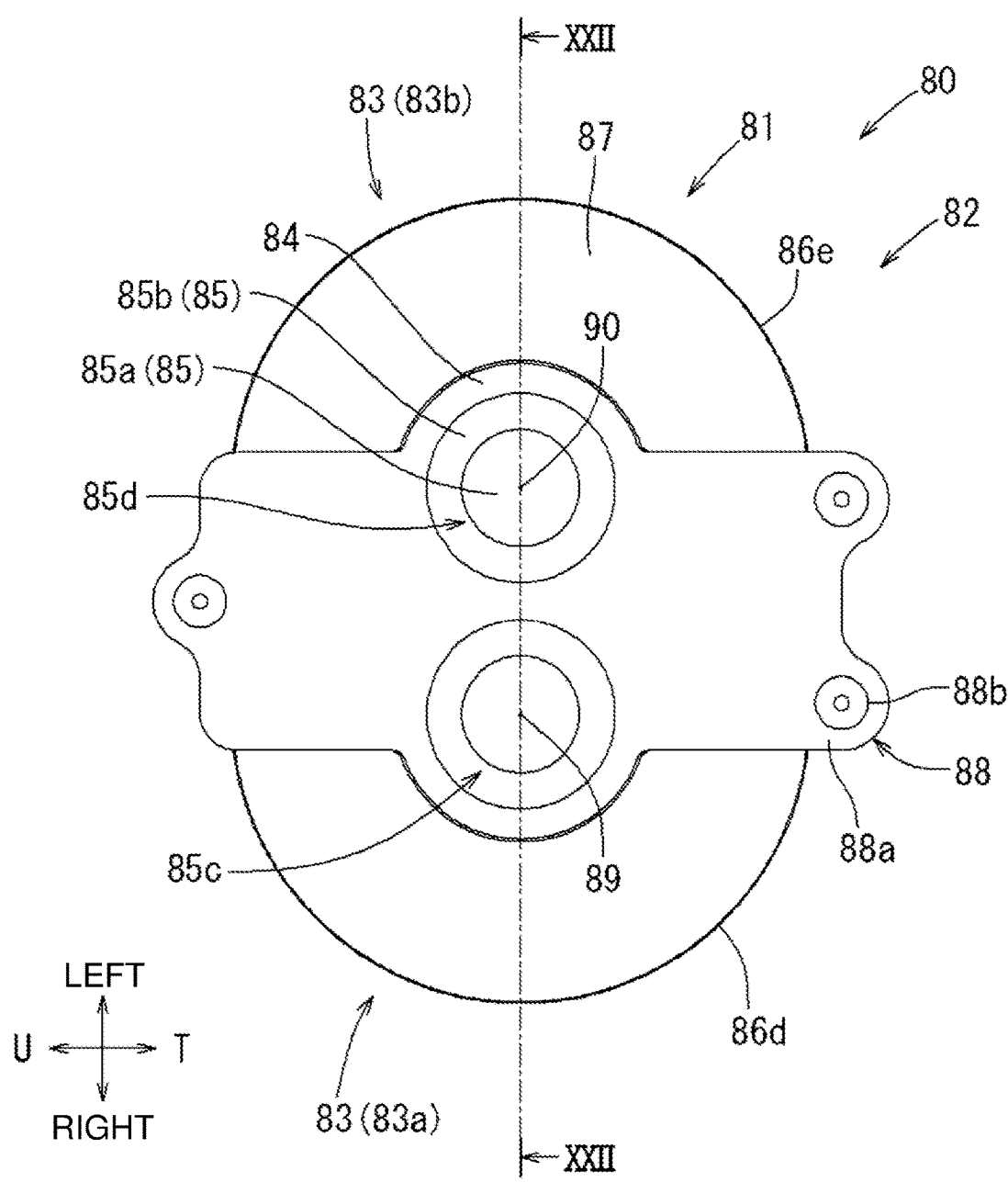
FIG. 20 is a plan view of the condensing lens viewed from an incidence surface.

As shown in FIGS. 19 and 20, the legs 88 each include a flat externally extending portion 88a. The externally extending portion 88a extends from the substrate contact surface 84 laterally from the lenses 83. Each pillar 88b extends upward from the externally extending portion 88a. Thus, the legs 88 are located outside the path of light passing through the lenses 83.

The cutting machines 1 and 80 according to the embodiments described above may be modified in various manners. In the above embodiments, the lens coupler 61 or 82 has the circular first emission surface 65d or 86a and the second emission surface 65e or 86b when viewed in the axial direction of the first center axis 73 or 89. In some embodiments, the lens coupler may have first and second emission surfaces with, for example, an elliptic shape or an oblong shape including two semicircles and a rectangle connected together when viewed in the axial direction of the first center axis 73 or 89. In the above embodiments, the first lens 62a and the second lens 62b are included in a single component, and the first lens 83a and the second lens 83b are included in a single component. In some embodiments, the first lens and the second lens may be separate components. The first lens and the second lens may have different shapes.

In the above embodiments, the first center axis 73 and the second center axis 74 are parallel to each other, and the first center axis 89 and the second center axis 90 are parallel to each other. In some embodiments, for example, the first and second center axes may extend toward the cutting tool 11 to cross each other. The first light source center 72c and the second light source center 72d may be at the luminescence centers with the highest brightness, instead of the geometric centers of the first light source 72a and the second light source 72b. In the above embodiments, the first center axis 73 or 89 and the second center axis 74 or 90 extend perpendicular to the surfaces of the first light source 72a and the second light source 72b. The positional relationship between the first light source 72a and the second light source 72b, the first center axis 73 or 89, and the second center axis 74 or 90 are not limited to this. For example, the structure with the first center axis perpendicular to the first light source includes the structure including the first light source having the main illumination direction parallel to the first center axis. In some embodiments, for example, the structure with the first center axis perpendicular to the first light source includes the positional relationship between the first light source and the first center axis with light emitted parallel to the first center axis from any position on the first emission surface.

In the above embodiments, the lens 62 has the emission surface 65 with a larger area than the incidence surface 64. In some embodiments, the lens may have the emission surface with a smaller area than the incidence surface. The outer reflection surface 66a or 87a, the spherical protrusion 64c, or the emission surface protrusion 65b or 86c may have a cross section with, instead of an arc of a perfect circle, any curved shape including an ellipse, a parabola, and a spindle shape. For example, a lamp may be used, instead of an LED. The present disclosure is not limited to a sliding miter saw and is also applicable to a tabletop or portable miter saw without a function of sliding a machine body.

REFERENCE SIGNS LIST 1 cutting machine (first embodiment)
2 base
2a rotation shaft
3 sub-table
4 turntable
4a table upper surface
4b arm supporter
5 table extension
5a cutting edge plate
5b groove
6 positioning fence
6a positioning surface
7 miter scale plate
7a fixing screw
7b positioning recess
10 machine body
10a vertical swing support shaft
11 cutting tool
11a right side surface
11b left side surface
12 stationary cover
12a arrow
12b threaded hole
13 movable cover
13a through-hole
14 fixing screw
15 outer flange
16 inner flange
17 dust-collection guide
17a dust-collection hose
18 rear dust-collection port
18a dust-collection hose
20 motor housing
20a inlet
20b outlet 21 electric motor
22 gear housing
23 output shaft
25 battery mount
26 battery pack
27 controller housing
28 controller
30 handle unit
31 operation handle
32 switch lever
33 lock-off button
34 illuminator switch
40 body support arm
40a lateral tilt support shaft
41 slide bar
42 slide base
45 turntable fixing mechanism
46 grip unit
47 fixing rod
50 positive lock unit
51 unlock lever
52 positioning pin
60 illuminator
61 lens coupler
62 lens
62a first lens
62b second lens
63 substrate contact surface
64 incidence surface
64a incidence surface recess (first incidence surface recess, second incidence surface recess)
64b side surface
64c spherical protrusion
64d first incidence surface
64e second incidence surface
65 emission surface
65a arc-shaped recess
65b emission surface protrusion
65c center recess
65d first emission surface
65e second emission surface
65f first circumference
65g second circumference
65h first outermost portion
65i second outermost portion
66 circumferential surface
66a outer reflection surface
66b cross-sectional arc
67 leg
67a externally extending portion
67b pillar
67c enlarged-diameter portion
70 illuminator cover
70a fastening bolt
70b through-hole
70c threaded hole
71 substrate
71a LED controller
71b, 71c through-hole
71d fastening bolt
72 LED (light source)
72a first light source
72b second light source
72c first light source center
72d second light source center
73 first center axis
74 second center axis
80 cutting machine (second embodiment)
81 illuminator
82 lens coupler
83 lens
83a first lens
83b second lens
84 substrate contact surface
85 incidence surface
85a incidence surface recess (spherical protrusion, first incidence surface recess, second incidence surface recess)
85b side surface
85c first incidence surface
85d second incidence surface
86 emission surface
86a first emission surface
86b second emission surface
86c emission surface protrusion
86d first circumference
86e second circumference
86f first outermost portion
86g second outermost portion
87 circumferential surface
87a outer reflection surface
87b cross-sectional arc
88 leg
88a externally extending portion
88b pillar
89 first center axis
90 second center axis
W workpiece
S imaginary plane
L radiated ray
A1, A2 central angle
r1 first distance
r2 second distance
r3 distance (between first center axis and second center axis)
K predetermined angle

What is claimed is:

1. A cutting machine, comprising:
a machine body including a disc-shaped cutting tool; and
an illuminator configured to emit light from a radially outer portion of the cutting tool toward the cutting tool, the illuminator including
a first light source and a second light source located across a plane including the cutting tool,
a first lens having (i) a first incidence surface and (ii) a first emission surface through which light is emittable, and
a second lens (i) having a second incidence surface and (ii) a second emission surface through which light is emittable,
wherein:
the first incidence surface is configured to receive light incident from the first light source;
the first emission surface includes a first outermost portion located farthest and at a first distance from a first center axis;
the first center axis (i) includes a first light surface center of the first light source and (ii) is perpendicular to the first light source;
the second incidence surface is configured to receive light incident from the second light source;
the second emission surface includes a second outermost portion located farthest and at a second distance from a second center axis;

the second center axis (i) includes a second light source center of the second light source and (ii) is perpendicular to the second light source; and a distance between the first center axis and the second center axis is shorter than a sum of the first distance and the second distance.

2. The cutting machine according to claim 1, wherein the first lens and the second lens are in a single component.

3. The cutting machine according to claim 2, wherein the first emission surface includes an arc-shaped first circumference (i) centered on the first center axis and (ii) having an angle exceeding 180°, the second emission surface includes an arc-shaped second circumference (i) centered on the second center axis and (ii) having an angle exceeding 180°, and the arc-shaped first circumference and the arc-shaped second circumference meet each other.

4. The cutting machine according to claim 2, wherein the first lens includes an outer reflection surface configured to reflect, toward the first emission surface, light incident through the first incidence surface and passing through the first lens, the outer reflection surface has (i) a convex shape, (ii) a first end that is an end of the outer reflection surface closest to the first emission surface and (iii) a second end that is another end of the outer reflection surface farthest from the first emission surface, the outer reflection surface is farthest from the first center axis, in a plane perpendicular to the first center axis, at the first end of the outer reflection surface than at other planes perpendicular to the first center axis that intersect the outer reflection surface, and distances between the outer reflection surface and the first center axis, in the first plane and the other planes perpendicular to the first center axis, decrease to the second end of the outer reflection surface.

5. The cutting machine according to claim 2, wherein the first lens includes an incidence surface recess on the first incidence surface, and a spherical protrusion protruding toward the first light source from a bottom surface of the incidence surface recess.

6. The cutting machine according to claim 1, wherein the first emission surface includes an arc-shaped first circumference (i) centered on the first center axis and (ii) having a length extending over a range exceeding 180°, the second emission surface includes an arc-shaped second circumference (i) centered on the second center axis and (ii) having a length extending over a range exceeding 180°, and the arc-shaped first circumference and the arc-shaped second circumference meet each other.

7. The cutting machine according to claim 6, wherein the first lens includes an outer reflection surface configured to reflect, toward the first emission surface, light incident through the first incidence surface and passing through the first lens, the outer reflection surface has (i) a convex shape, (ii) a first end that is an end of the outer reflection surface closest to the first emission surface and (iii) a second end that is another end of the outer reflection surface farthest from the first emission surface, the outer reflection surface is farthest from the first center axis, in a plane perpendicular to the first center axis, at the first end of the outer reflection surface than at other planes perpendicular to the first center axis that intersect the outer reflection surface, and distances between the outer reflection surface and the first center axis, in the first plane and the other planes perpendicular to the first center axis, decrease to the second end of the outer reflection surface.

8. The cutting machine according to claim 6, wherein the first lens includes an incidence surface recess on the first incidence surface, and a spherical protrusion protruding toward the first light source from a bottom surface of the incidence surface recess.

9. The cutting machine according to claim 1, wherein the first lens includes an outer reflection surface configured to reflect, toward the first emission surface, light incident through the first incidence surface and passing through the first lens, the outer reflection surface has (i) a convex shape, (ii) a first end that is an end of the outer reflection surface closest to the first emission surface and (iii) a second end that is another end of the outer reflection surface farthest from the first emission surface, the outer reflection surface is farthest from the first center axis, in a plane perpendicular to the first center axis, at the first end of the outer reflection surface than at other planes perpendicular to the first center axis that intersect the outer reflection surface, and distances between the outer reflection surface and the first center axis, in the first plane and the other planes perpendicular to the first center axis, decrease to the second end of the outer reflection surface.

10. The cutting machine according to claim 9, wherein the outer reflection surface has a cross-sectional arc (i) centered on the first center axis and (ii) having an angle exceeding 180°.

11. The cutting machine according to claim 10, wherein the first lens includes an incidence surface recess on the first incidence surface, and a spherical protrusion protruding toward the first light source from a bottom surface of the incidence surface recess.

12. The cutting machine according to claim 9, wherein the first lens includes an incidence surface recess on the first incidence surface, and a spherical protrusion protruding toward the first light source from a bottom surface of the incidence surface recess.

13. The cutting machine according to claim 1, wherein the first lens includes an incidence surface recess on the first incidence surface, and a spherical protrusion protruding toward the first light source from a bottom surface of the incidence surface recess.

14. The cutting machine according to claim 13, wherein the incidence surface recess has a side surface at least partially having an arc shape, and the arc shape is concentric with the first light source in a cross section including the first center axis.

15. The cutting machine according to claim 1, further comprising:

a substrate on which the first light source and the second light source are attached, wherein
the first lens includes, on the first incidence surface, a first incidence surface recess closed with the substrate, and
the second lens includes, on the second incidence surface, a second incidence surface recess closed with the substrate and separated from the first incidence surface recess.

16. The cutting machine according to claim 1, wherein
the first lens includes an emission surface protrusion protruding at a position inward from a circumference of the first emission surface and having a cylindrical shape or a shape of a partial sphere.

17. The cutting machine according to claim 16, wherein
the first lens includes
the emission surface protrusion with a cylindrical shape, and
a center recess at an axial center of the emission surface protrusion.

18. The cutting machine according to claim 16, wherein
the first emission surface of the first lens has an arc-shaped recess surrounding a circumference of the emission surface protrusion.

19. The cutting machine according to claim 1, wherein
the first lens includes a leg extending sideward from a circumference of one of the first incidence surface and the first emission surface.

20. The cutting machine according to claim 1, wherein
the machine body is vertically swingable about a vertical swing support shaft with respect to a base configured to receive a workpiece.

\* \* \* \* \*